United States Patent [19]

Shibazaki et al.

[11] Patent Number: 5,546,197
[45] Date of Patent: Aug. 13, 1996

[54] METHOD AND APPARATUS FOR GENERATING HALFTONE IMAGES WITH ADJUSTED SCREEN ANGLES

[75] Inventors: Hiroshi Shibazaki; Masayuki Sasahara, both of Kyoto, Japan

[73] Assignee: Dainippon Screen Mfg. Co., Ltd., Kyoto, Japan

[21] Appl. No.: 583,583

[22] Filed: Jan. 5, 1996

Related U.S. Application Data

[63] Continuation of Ser. No. 216,384, Mar. 23, 1994, abandoned.

[30] Foreign Application Priority Data

Mar. 26, 1993 [JP] Japan .................................. 5-092244

[51] Int. Cl.[6] ............................ H04N 1/21; H04N 1/40; H04N 1/46; H04N 1/23
[52] U.S. Cl. ......................... 358/534; 358/298; 358/454; 358/515; 358/536
[58] Field of Search ........................... 358/515, 518, 358/534, 536, 455, 456, 457, 459, 448, 463, 298, 454; H04N 1/21, 1/40, 1/46, 1/23

[56] References Cited

U.S. PATENT DOCUMENTS

| | | | |
|---|---|---|---|
| 3,742,129 | 6/1973 | Roberts et al. | 358/536 |
| 4,419,690 | 12/1983 | Hammes | 358/534 |
| 4,499,489 | 2/1985 | Gall et al. | 358/536 |
| 4,553,172 | 11/1985 | Yamada et al. | 358/536 |
| 4,626,902 | 12/1986 | Yamada | 358/530 |
| 4,628,366 | 12/1986 | Yamada | 358/462 |
| 4,673,971 | 6/1987 | Ikuta et al. | 358/534 |
| 4,768,101 | 8/1988 | Webb | 358/298 |
| 4,903,147 | 2/1990 | Kanno et al. | 358/448 |
| 4,924,301 | 5/1990 | Surbrook | 358/534 |
| 5,019,896 | 5/1991 | Shimazaki | 358/536 |
| 5,045,931 | 9/1991 | Sakamoto | 358/456 |
| 5,067,025 | 11/1991 | Kitagawa | 358/456 |
| 5,299,020 | 3/1994 | Carlebach | 358/536 |

*Primary Examiner*—Kim Y. Vu
*Assistant Examiner*—Kimberly A. Williams
*Attorney, Agent, or Firm*—Lowe, Price, LeBlanc & Becker

[57] ABSTRACT

Each image area in a total image is assigned with a screen angle mode Ms indicating whether screen angles of magenta and cyan separations are to be adjusted or not. Screen angle data representing screen angles of magenta and cyan are produced according to the screen angle modes Ms. A dot signal for recording a halftone image of each of the magenta and the cyan separations is generated by comparing screen pattern data of a certain screen angle specified by the screen angle data with image data for each color separation. Accordingly, the present invention effectively prevents a moire in any image area included in a printing image.

14 Claims, 16 Drawing Sheets

D(Y)=10%, D(M)=30%
$\theta$(Y)= 0°, $\theta$(M)=45°

D(Y)=10%, D(C)=50%
$\theta$(Y)= 0°, $\theta$(C)=45°

D(Y)=10%
$\theta$(Y)= 0°

D(M)=30%
$\theta$(M)=45°

D(C)=50%
$\theta$(C)=45°

COLOR PALETTE CP

| COLOR NUMBER | Y | M | C | K |
|---|---|---|---|---|
| #1 | 0 | 0 | 100 | 0 |
| #2 | I | I | I | I |
| #3 | 0 | 0 | 0 | 100 |

PICTURE DATA

ARRANGEMENT

FIRST SCREEN-ANGLE-MODE
TABLE Twa FOR LINEWORK

| COLOR NUMBER | SCREEN ANGLE MODE Ms |
|---|---|
| #0 | 0 |
| #1 | 1 |
| #2 | 2 |

SCREEN ANGLE MODE
Ms=0: NO CHANGE IN SCREEN ANGLES (STANDARD MODE)
Ms=1: EXCHANGE SCREEN ANGLES OF
       MAGENTA AND CYAN (CM EXCHANGE MODE)
Ms=2: AUTOMATICALLY SET SCREEN ANGLES
       ACCORDING TO DOT PERCENTAGES OF COLOR
       SEPARATIONS (AUTO MODE)

COLOR PALETTE

| COLOR NUMBER | Y | M | C | K |
|---|---|---|---|---|
| #3 | 100 | 50 | 0 | 0 |
| #4 | 0 | 0 | 30 | 10 |
| #5 | 100 | 50 | 30 | 10 |

SECOND SCREEN-ANGLE-MODE TABLE Twb
FOR OVERLAPPING LINEWORK AREA

| COLOR NUMBER FOR OVERLAPPING AREA | ORIGINAL COLOR NUMBER | | SCREEN ANGLE REFERENCE NUMBER | |
|---|---|---|---|---|
| | N0 | N1 | C | M |
| #5 | #3 | #4 | 1 | 0 |

SCREEN ANGLE TO BE REFERRED

Fig. 9(A)
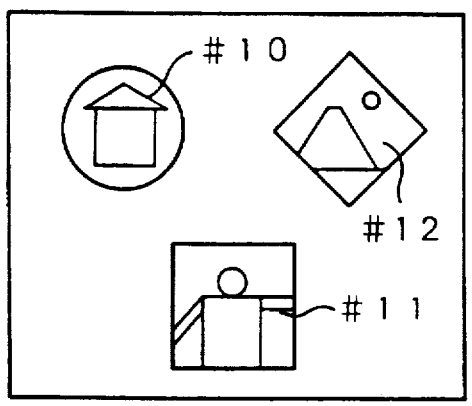
Fig. 9(B)
THIRD SCREEN-ANGLE-MODE TABLE Tpa FOR PICTURE
| COLOR NUMBER FOR WINDOW | SCREEN ANGLE MODE Ms |
|---|---|
| #10 | 1 |
| #11 | 0 |
| #12 | 2 |
Fig. 10(A)
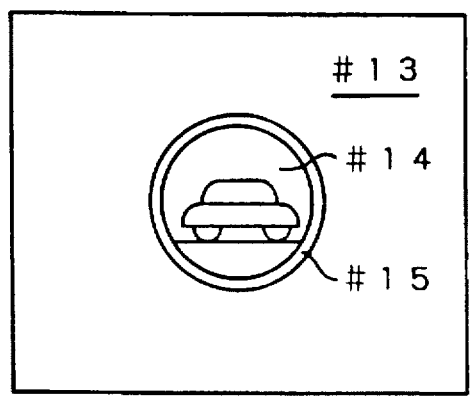
Fig. 10(B)
COLOR PALETTE
| COLOR NUMBER | Y | M | C | K |
|---|---|---|---|---|
| #13 | 0 | 50 | 100 | 0 |
| #14 | I | I | I | I |
| #15 | I | I | 100 | 0 |
Fig. 10(C)
FOURTH SCREEN-ANGLE-MODE TABLE Tpb FOR OVERLAPPING PICTURE AREA
| COLOR NUMBER FOR OVERLAPPING AREA | ORIGINAL COLOR NUMBER | | SCREEN ANGLE REFERENCE NUMBER | |
|---|---|---|---|---|
| | N0 | N1 | C | M |
| #15 | #13 | #14 | 0 | 1 |
SCREEN ANGLE TO BE REFERRED

Fig. 11(A)

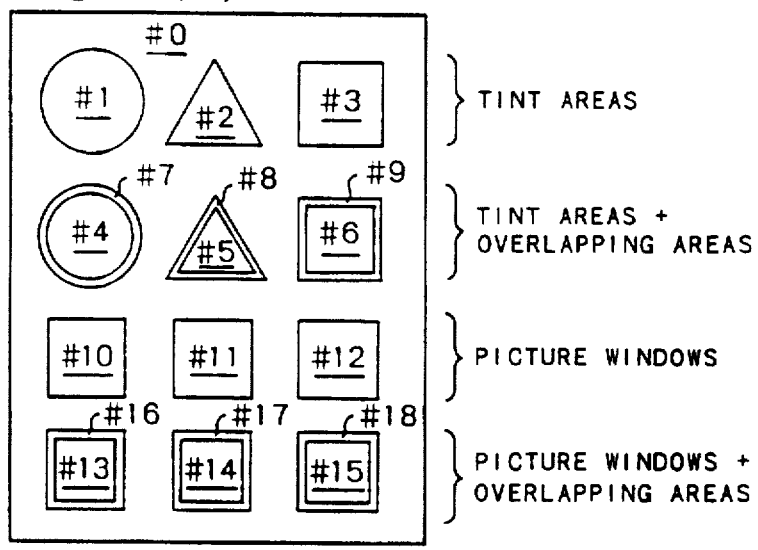

Fig. 11(B)

FIRST SCREEN ANGLE MODE TABLE Twa FOR LINEWORK

| COLOR NUMBER | SCREEN ANGLE MODE Ms |
|---|---|
| #0 | 0 |
| #1 | 0 |
| #2 | 1 |
| #3 | 2 →0 |
| #4 | 0 |
| #5 | 1 |
| #6 | 2 →1 |

Fig. 11(C)

SECOND SCREEN ANGLE MODE TABLE Twb FOR OVERLAPPING LINEWORK AREA

| COLOR NUMBER FOR OVERLAPPING AREA | ORIGINAL COLOR NUMBER | | SCREEN ANGLE REFERENCE NUMBER | |
|---|---|---|---|---|
| | N0 | N1 | C | M |
| #7 | #0 | #4 | 1 | 0 |
| #8 | #0 | #5 | 0 | 1 |
| #9 | #0 | #6 | 1 | 1 |

Fig. 11(D)

THIRD SCREEN ANGLE MODE TABLE Tpa FOR PICTURE

| COLOR NUMBERS FOR WINDOW | SCREEN ANGLE MODE Ms |
|---|---|
| #10 | 0 |
| #11 | 1 |
| #12 | 2 →0 |
| #13 | 0 |
| #14 | 1 |
| #15 | 2 →1 |

Fig. 11(E)

FOURTH SCREEN ANGLE MODE TABLE Tpb FOR OVERLAPPING PICTURE AREA

| COLOR NUMBERS FOR OVERLAPPING AREA | ORIGINAL COLOR NUMBER | | SCREEN ANGLE REFERENCE NUMBER | |
|---|---|---|---|---|
| | N0 | N1 | C | M |
| #16 | #0 | #13 | 0 | 0 |
| #17 | #0 | #14 | 0 | 1 |
| #18 | #0 | #15 | 1 | 0 |

Fig. 13(A)

SCREEN ANGLE SPECIFICATION TABLE

| COLOR NUMBER | SCREEN ANGLE CODE Cs | |
|---|---|---|
| | C | M |
| #0 | 0 | 1 |
| #1 | 0 | 1 |
| #2 | 1 | 0 |
| #3 | 0 | 1 |
| #4 | 0 | 1 |
| #5 | 1 | 0 |
| #6 | 1 | 0 |
| #7 | — | — |
| #8 | — | — |
| #9 | — | — |
| #10 | 0 | 1 |
| #11 | 1 | 0 |
| #12 | 0 | 1 |
| #13 | 0 | 1 |
| #14 | 1 | 0 |
| #15 | 1 | 0 |
| #16 | — | — |
| #17 | — | — |
| #18 | — | — |

| COLOR NUMBER | SCREEN ANGLE CODE Cs | |
|---|---|---|
| | C | M |
| #0 | 0 | ① |
| #1 | 0 | 1 |
| #2 | 1 | 0 |
| #3 | 0 | 1 |
| #4 | ⓪ | 1 |
| #5 | 1 | 0 |
| #6 | 1 | 0 |
| #7 | 0 | 1 |
| #8 | 0 | 0 |
| #9 | 1 | 0 |
| #10 | 0 | 1 |
| #11 | 1 | 0 |
| #12 | 0 | 1 |
| #13 | 0 | 1 |
| #14 | 1 | 0 |
| #15 | 1 | 0 |
| #16 | 0 | 1 |
| #17 | 0 | 0 |
| #18 | 1 | 1 |

Fig. 16(A)

CONTENTS OF SELECT TABLE 412

| SCREEN ANGLE CODE Cs | | ANGLE SELECTION SIGNAL Ss | | | |
|---|---|---|---|---|---|
| C | M | Y | M | C | K |
| 0 | 0 | 0 | 0 | 0 | 0 |
| 0 | 1 | 0 | 1 | 0 | 0 |
| 1 | 0 | 0 | 0 | 1 | 0 |
| 1 | 1 | 0 | 1 | 1 | 0 |

Fig. 16(B)

| | Y | M | C | K |
|---|---|---|---|---|
| $\theta_0$ | 0° | 15° | 15° | 75° |
| $\theta_1$ | — | 45° | 45° | — |

TWO SCREEN ANGLES FOR EACH COLOR SEPARATION

COLOR PALETTE

| COLOR NUMBER | Y | M | C | K |
|---|---|---|---|---|
| #3 | 90 | 50 | 0 | 0 |
| #4 | 0 | 0 | 30 | 10 |
| #5 | 90 | 50 | 30 | 10 |

SECOND SCREEN ANGLE MODE TABLE Twb
FOR OVERLAPPING LINEWORK AREA

| COLOR NUMBER FOR OVERLAPPING AREA | ORIGINAL COLOR NUMBER | | SCREEN ANGLE REFERENCE NUMBER | | | |
|---|---|---|---|---|---|---|
| | N0 | N1 | Y | M | C | K |
| #5 | #3 | #4 | 0 | 0 | 1 | 1 |

SCREEN ANGLE SPECIFICATION TABLE

| COLOR NUMBER | SCREEN ANGLE CODE Cs | | | |
|---|---|---|---|---|
| | Y | M | C | K |
| #1 | 00 | 10 | 01 | 11 |
| #2 | 00 | 10 | 01 | 11 |
| | | | | |

Cs = 00 : 0°
01 : 15°
10 : 45°
11 : 75°

METHOD AND APPARATUS FOR GENERATING HALFTONE IMAGES WITH ADJUSTED SCREEN ANGLES

This application is a continuation of Application Ser. No. 08/216,384 filed Mar. 23, 1994 now abandoned.

BACKGROUND OF THE INVENTION

1. Field of the Invention

The present invention relates to a method and an apparatus for generating dot signals to record halftone images of four color separations of Y (yellow), M (magenta), C (cyan), and K (black), and more specifically to a technique to adjust screen angles of the four color separations for each image area included in a total image.

2. Description of the Related Art

A color print is usually reproduced by overprinting halftone images of color separations for four process colors, that is, Y (yellow), M (magenta), C (cyan), and K (black). A halftone image of each color is a collection of dots whose size is determined according to the density of each color. In a halftone image, an orientation of dots with respect to a predetermined reference direction (for example, a scanning direction of a recording scanner) is called "screen angle". As is well known in the art, screen angles $\theta(Y)$, $\theta(M)$, $\theta(C)$, and $\theta(K)$ of the four color separations usually have different values, for example, $\theta(y)=0°$, $\theta(M)=45°$, $\theta(C)=15°$, and $\theta(K)=75°$, in order to prevent a moire which might be generated by overprinting halftone images of Y, M, C, and K.

Generally, the yellow separation has little effect on generating a moire because density of yellow separation is lower than the other color separations. However, a moire is sometimes observed in a thin green-colored image area which is mostly painted with yellow and cyan inks. A moire is also observed occasionally in a skin-colored image area which is mostly painted with yellow and magenta inks. The moire related to yellow can be distinctively observed when the muddiness in yellow ink is high. Elimination of the moire is therefore highly required even in those image areas which are painted with two color inks including yellow.

All the four color separations of Y, M, C, and K are not always used for printing each image area within a total color image and in many cases, a linework image is printed only in two or three color inks. The moire should also be eliminated in such image areas in the total image.

SUMMARY OF THE INVENTION

An object of the present invention is accordingly to effectively prevents a moire in each image area included in a total image.

In order to attain at least partly the above object, the present invention provides an apparatus for generating a dot signal for each of four color separations for yellow, magenta, cyan, and black inks to record a halftone image of each color separation. The apparatus comprises: a screen angle information memory for storing screen angle data assigned to each of a plurality of image areas included in a whole image, the screen angle data indicating screen angles of magenta and cyan separations; an image data memory for storing color-separated image data; and a dot signal generator for comparing screen pattern data of a screen angle specified by the screen angle data with the color-separated image data for each of the magenta and cyan separations, to thereby generate a dot signal for recording a halftone image of each of the magenta and cyan separations.

Since the screen angles of the magenta and Cyan separations are adjusted according to the screen angle data, an undesirable moire can be prevented by adjusting the screen angles even in image areas where a moire is often generated at standard dot angles.

In the preferred embodiment of the present invention, the apparatus further comprises: a memory for storing mode data assigned to each of the plurality of image areas, the mode data representing a first mode where screen angles of the magenta and cyan separations are set at predetermined standard values, and a second mode where the screen angles of the magenta and cyan separations are exchanged each other from the predetermined standard values; and screen angle data generating means for producing the screen angle data of the magenta and cyan separations according to the mode data.

Preferably, a combination of the screen angles of the magenta and cyan separations are 15 degrees and 45 degrees. This effectively prevents a moire and enhances sharpness of edges in an image for one of the magenta and cyan separations whose screen angle is 45 degrees.

The screen angle data generating means comprises: means for determining the screen angles of the magenta and cyan separations so that one of the magenta and cyan separations which has a greater dot percentage but is not equal to 100% has a screen angle of approximately forty-five degrees, and that the other of the magenta and cyan separations has a screen angle of approximately fifteen degrees.

The screen angle data further indicates that a screen angle of a yellow separation is equal to approximately zero degrees, and that a screen angle of a black separation is equal to approximately seventy-five degrees.

According to an aspect of the present invention, the apparatus further comprises: a memory for storing mode data assigned to each of the plurality of image areas, the mode data representing a first mode where screen angles of the four color separations are set at predetermined standard vales, and a second mode where the screen angles of the four color separations are adjusted from the predetermined standard vales; and screen angle data generating means for producing the screen angle data representing screen angles $\theta(Y)$, $\theta(M)$, $\theta(C)$, and $\theta(K)$ for yellow, magenta, cyan, and black, respectively, according to the following Table A with respect to pixels to which the mode data indicating the second mode is assigned:

TABLE A

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y | N/A | 45 | — | — | — |
| M | N/A | — | 45 | — | — |
| C | N/A | — | — | 45 | — |
| K | N/A | — | — | — | 45 |
| Y and M | N/A | 0 | 45 | — | — |
| Y and C | N/A | 0 | — | 45 | — |
| Y and K | N/A | 0 | — | — | 45 |
| M and C | D(M) > D(C) | — | 45 | 0 | — |
| M and C | D(M) ≦ D(C) | — | 0 | 45 | — |
| M and K | D(M) > D(K) | — | 45 | — | 0 |
| M and K | D(M) ≦ D(K) | — | 0 | — | 45 |
| C and K | D(C) > D(K) | — | — | 45 | 0 |
| C and K | D(C) ≦ D(K) | — | — | 0 | 45 |

TABLE A-continued

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y, M and C | D(M) > D(C) | 75 | 45 | 15 | — |
| Y, M and C | D(M) ≦ D(C) | 75 | 15 | 45 | — |
| Y, M and K | D(M) > D(K) | 75 | 45 | — | 15 |
| Y, M and K | D(M) ≦ D(K) | 75 | 15 | — | 45 |
| Y, C and K | D(C) > D(K) | 75 | — | 45 | 15 |
| Y, C and K | D(C) ≦ D(K) | 75 | — | 15 | 45 |
| M, C and K | D(M) > D(C) & D(M) > D(K) | — | 45 | 15 | 75 |
| M, C and k | D(C) ≧ D(M) & D(C) > D(K) | — | 15 | 45 | 75 |
| M, C and k | D(K) ≧ D(M) & D(K) ≧ D(C) | — | 15 | 75 | 45 |
| Y, M, C and K | D(M) > D(C) & D(M) > D(K) | 0 | 45 | 15 | 75 |
| Y, M, C and k | D(C) ≧ D(M) & D(C) > D(K) | 0 | 15 | 45 | 75 |
| Y, M, C and k | D(K) ≧ D(M) & D(K) ≧ D(C) | 0 | 15 | 75 | 45 | where D(Y), D(M), D(C), and D(K) denote dot percentages of yellow, magenta, cyan, and black, respectively, and "N/A" means that there are no conditions for the relations among the dot percentages D(Y), D(M), D(C), and D(K).

Alternatively, Table A can be replaced by the following Table B:

TABLE B

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y | N/A | 45 | — | — | — |
| M | N/A | — | 45 | — | — |
| C | N/A | — | — | 45 | — |
| K | N/A | — | — | — | 45 |
| Y and M | N/A | 0 | 45 | — | — |
| Y and C | N/A | 0 | — | 45 | — |
| Y and K | N/A | 0 | — | — | 45 |
| M and C | D(M) > D(C) | — | 45 | 15 | — |
| M and C | D(M) ≦ D(C) | — | 15 | 45 | — |
| M and K | D(M) > D(K) | — | 45 | — | 75 |
| M and K | D(M) ≦ D(K) | — | 15 | — | 45 |
| C and K | D(C) > D(K) | — | — | 45 | 75 |
| C and K | D(C) ≦ D(K) | — | — | 15 | 45 |
| Y, M and C | D(M) > D(C) | 15/75 | 45 | 0 | — |
| Y, M and C | D(M) ≦ D(C) | 15/75 | 0 | 45 | — |
| Y, M and K | D(M) > D(K) | 15/75 | 45 | — | 0 |
| Y, M and K | D(M) ≦ D(K) | 15/75 | 0 | — | 45 |
| Y, C and K | D(C) > D(K) | 15/75 | — | 45 | 0 |
| Y, C and K | D(C) ≦ D(K) | 15/75 | — | 0 | 45 |
| M, C and K | D(M) > D(C) & D(M) > D(K) | — | 45 | 15 | 75 |
| M, C and k | D(C) ≧ D(M) & D(C) > D(K) | — | 15 | 45 | 75 |
| M, C and k | D(K) ≧ D(M) & D(K) ≧ D(C) | — | 15 | 75 | 45 |
| Y, M, C and K | D(M) > D(C) & D(M) > D(K) | 0 | 45 | 15 | 75 |
| Y, M, C and k | D(C) ≧ D(M) & D(C) > D(K) | 0 | 15 | 45 | 75 |
| Y, M, C and k | D(K) ≧ D(M) & D(K) ≧ D(C) | 0 | 15 | 75 | 45 | where D(Y), D(M), D(C), and D(K) denote dot percentages of yellow, magenta, cyan, and black, respectively, "N/A" means that there are no conditions for the relations among the dot percentages D(Y), D(M), D(C), and D(K), and "15/75" means arbitrary one of 15° and 75°.

According to another aspect of the present invention, the apparatus further comprises: a memory for storing reference data assigned to an overlapping area, the overlapping area being formed between first and second image areas so that a density of each of four color separations of the overlapping area is equal to one of the first and second image areas, the reference data indicating, with respect to each of the magenta and cyan separations, which one of two screen angles for the first and second image areas is used as a screen angle of the overlapping area.

The present invention is also directed to a method for generating a dot signal for each of four color separations for yellow, magenta, cyan, and black inks to record a halftone image of each color separation. The method comprises the steps of: (a) providing color-separated image data; (b) providing screen angle data for each of a plurality of image areas included in a whole image, the screen angle data indicating screen angles of magenta and cyan separations; and (c) comparing screen pattern data of a screen angle specified by the screen angle data with the color-separated image data for each of the magenta and cyan separations, to thereby generate a dot signal for recording a halftone image of each of the magenta and cyan separations.

These and other objects, features, aspects, and advantages of the present invention will become more apparent from the following detailed description of the preferred embodiment with the accompanying drawings.

BRIEF DESCRIPTION OF THE DRAWINGS

FIGS. 3(A) through 3(D) show a typical structure of linework data;

FIGS. 9(A) and 9(B) show screen angle modes set for three picture windows;

FIGS. 10(A) through 10(C) show an exemplified setting of screen angle modes in a case of overlaying between a selected picture and a tint area;

FIGS. 11(A) through 11(E) show an example where color numbers are allocated to a plurality of image areas;

FIGS. 13(A) and 13(B) show an example of a screen angle specification table;

FIGS. 16(A) and 16(B) show contents of a select table and values of screen angle signals $\theta_0$ and $\theta_1$

DESCRIPTION OF THE PREFERRED EMBODIMENT

A. Setting Screen angles

Figure 1A:
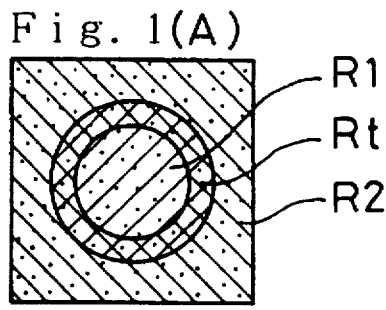
FIGS. 1(A) through 1(F) show an image where an overlapping area exists between two tint areas.
Figure 1B:
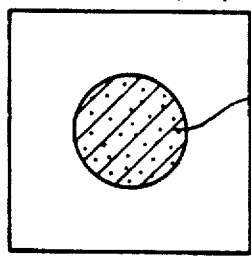
Figure 1C:
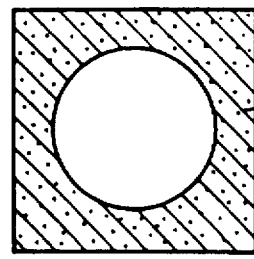

Appropriate screen angles of a tint area, that is, an area filled with a uniform color, will be explained first below. Standard screen angles θ(Y), θ(M), θ(C), and θ(K) for yellow, magenta, cyan, and black separations are equal to 0°, 45°, 15°, and 75°, respectively.

For clarity of explanation, only the screen angles of the magenta and cyan separations are to be exchanged in this first embodiment. Whether the screen angles of magenta and cyan are exchanged or not is determined according to the following conditions:

Conditions of exchanging screen angles of magenta and cyan:

$D(M) \neq 100\%, D(M) > D(C): \theta(M) = 45°, \theta(C) = 15°$ (1a)

$D(C) \neq 100\%, D(M) < D(C): \theta(M) = 15°, \theta(C) = 45°$ (1b)

$D(M) = 100\% : \theta(M) = 15°, \theta(C) = 45°$ (1c)

$D(C) = 100\%, D(M) \neq 100\%: \theta(M) = 45°, \theta(C) = 15°$ (1d)

where D(M) and D(C) respectively denote dot percentages (or densities or lightness ) of the magenta and cyan separations. The term "dot percentage" in this specification means a density or lightness corresponding to the dot percentage as well as the dot percentage itself. The term "density" includes a standard density measured through a complementary color filter, a luminosity, and an equivalent neutral density.

The expression (1a) shows "Standard Mode" where the standard screen angles of 15° for cyan and 45° for magenta are maintained when the dot percentage of the magenta separation is greater than that of the cyan separation. The expression (1b) shows "CM Exchange Mode" where the screen angles are exchanged when the dot percentage of the cyan separation is not less than that of the magenta separation. The CM Exchange Mode is also set under the condition of D(M)=100% as indicated by the expression (1c) whereas the Standard Mode is set under the condition of D(C)=100% and D(M)≠100% as indicated by the expression (1d).

When a one-page image, or a total image, includes a plurality of image areas, the exchange of the screen angles of magenta and cyan can be automatically determined for each image area. In this case, the conditions of the expressions (1a) through (1d) are examined for each pixel in an image area, and the exchange of screen angles is executed for the image area where a majority of pixels are under the condition of D(M)<D(C).

A picture image may include an important image area, for example, a human face. In such a case, an operator checks the apparent color of the important image area and specifies whether the screen angles of magenta and cyan are to be exchanged to prevent an undesirable moire. For example, when a landscape with much green in color exists as a background of a human figure image, the green area is automatically extracted and the screen angles different from the standard angles are set for the green area, such as θ(M)=15° and θ(C)=45°. When a human figure exists in part of a landscape image which is a main image part with much green in color, on the other hand, the skin-colored area is automatically extracted and the standard screen angles are set only for the skin-colored image area whereas the exchanged screen angles, that is, θ(M)=15° and θ(C)=45°, are set for the rest of the image.

Sometimes an overlapping area is formed between two image areas to prevent blank area, or a dropout, in a color print. The overlapping area is an additional area of a uniform width formed on a boundary between two adjacent image areas, and the color of the overlapping area i s determined not to be distinctive in a color print. The overlapping area effectively prevents a dropout between the adjacent image areas in case of registering mismatch of color separations in printing. The screen angles of magenta and cyan in the overlapping area are set equal to the screen angles in one of the two image areas adjacent to the overlapping area.

FIG. 1 (A) shows an image including an overlapping area Rt formed on a boundary between first and second tint areas R1 and R2. As shown in FIG. 1(B), the first tint area R1 has dot percentages of D(Y)=10% and D(M)=30%. In the first tint area R1, the screen angle of magenta θ(M) is set equal to 45° while that of yellow θ(Y) is set equal to 0°. As shown in FIG. 1(C), on the other hand, the second tint area R2 has dot percentages of D (Y)=10% and D (C)=50%. In the second tint area R2, the screen angle of yellow θ(Y) is set equal to 0° whereas that of cyan θ(C) is set equal to 45°.

Figure 1D:
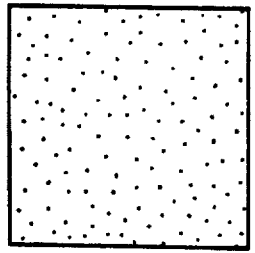
Figure 1E:
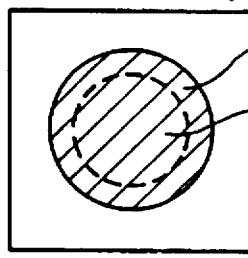
Figure 1F:
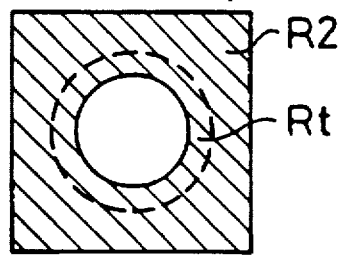

FIGS. 1(D), 1(E), and 1(F) show dot percentages and screen angles of yellow, magenta, and cyan separations for reproducing the image of FIG. 1(A). Since the screen angles of magenta and cyan are equal to 45° in the respective tint areas R1 and R2 shown in FIGS. 1(E) and 1(F), they are also equal to 45° in the overlapping area Rt. Although the overprinting of color separations which have the same screen angle might cause tone shift due to their registering mismatch, the width of the overlapping area Rt is generally half the width of one dot, and the tone shift will be negligible and has no substantial effects on the overall tone in the image.

B. System Structure

Figure 2:
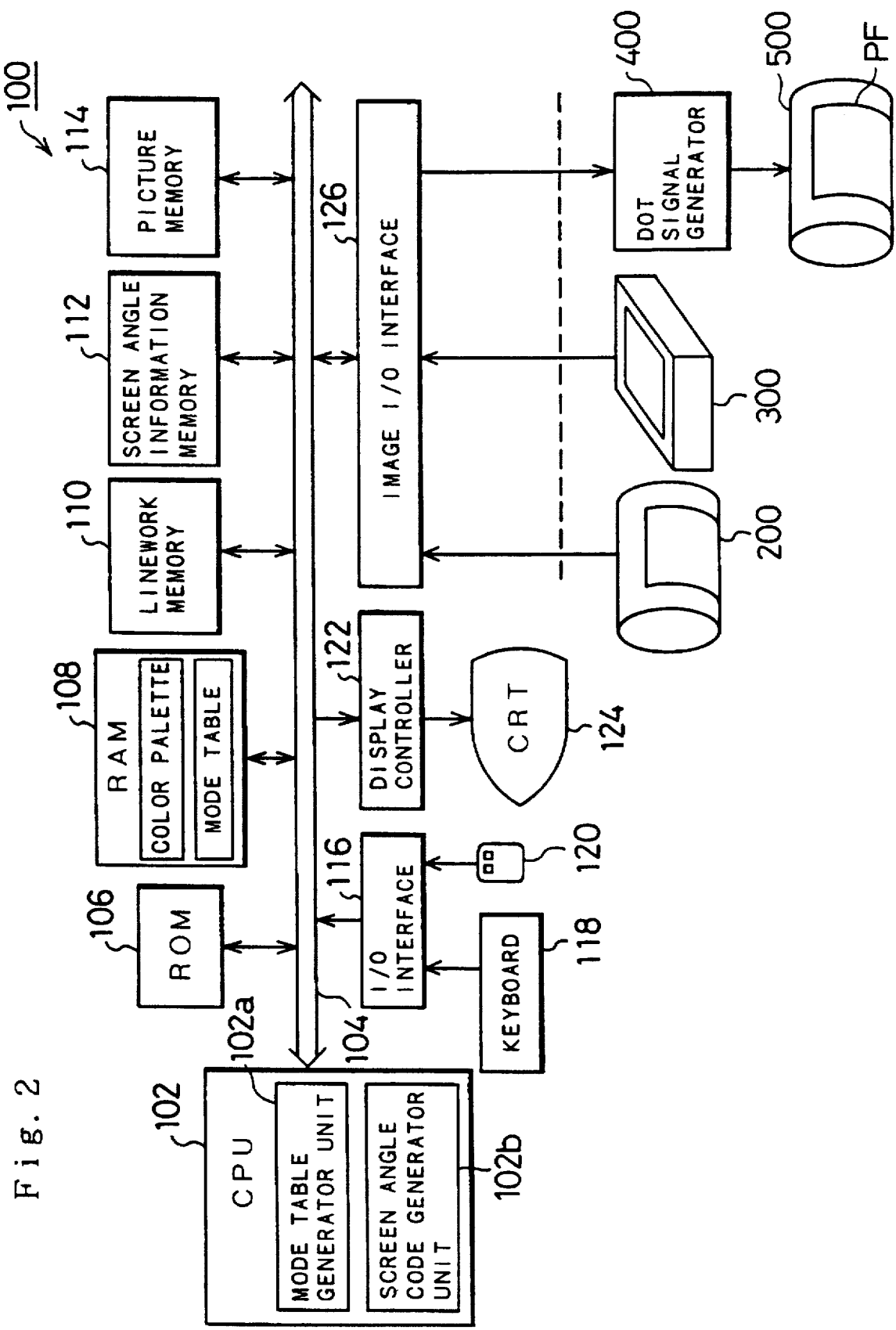
FIG. 2 is a block diagram showing a general structure of an image processing system embodying the invention which allows regulation of screen angles.

FIG. 2 is a block diagram showing the general structure of an image processing system embodying the present invention. The image processing system comprises an image processing apparatus 100, a color scanner 200, a black-and-white scanner 300 of a flat bed type, a dot signal generator 400, and a recording scanner 500. The color scanner 200 scans a picture like a photograph to capture picture data while the black-and-white scanner 300 scans a block copy to capture linework data. The image processing apparatus 100 executes a variety of image processing routines for the linework data and the picture data captured by the scanners 200 and 300. Details of the image processing apparatus 100 will be described later.

The dot signal generator 400 combines linework data with picture data after image processing, and generates dot signals for recording a composite image including a picture and a linework image. The recording scanner 500 receives the dot signals from the dot signal generator 400, and records halftone images according to the dot signals on a photosensitive film PF. The halftone images are generated for the four color separations of yellow, magenta, cyan, and black.

The image processing apparatus 100 comprises the following elements:

(a) CPU 102 for controlling the other elements of the image processing apparatus 100 and executing image processing routines on linework data and picture data; The CPU 102 includes a mode table generator unit 102a and a screen angle code generator unit 102b, which are implemented by execution of software programs stored in ROM 106 by the CPU 102. The CPU 102 and the other elements of the image processing apparatus 100 are interconnected by a bus 104.

(b) ROM 106 for storing programs to be executed by the CPU 102;

(c) RAM 108 for temporarily storing programs to be executed by the CPU 102 and a variety of data used for the image processing; The RAM 108 specifically stores a variety of parameters (such as image data size and offset values of picture data), a color palette, and a screen angle mode table (described later).

(d) Linework memory 110 for storing binary image data representing linework images; The CPU 102 uses the linework memory 110 to execute a variety of image processing routines including elimination of pin holes, coloring (or painting a certain image area uniformly with a desirable color), spreading, choking, pixel skipping, enlarging, setting picture windows in each of which a picture is fitted. The linework memory 110 includes a plurality of memory planes, each of which has the capacity of storing linework data for a one-page image.

(e) Screen angle information memory 112 for storing screen angle data representing screen angles of a linework image;

(f) Picture memory 114 for storing picture data as bit map data. The picture memory 114 includes a plurality of memory planes, each of which has the capacity of storing picture data for a one-page image.

(g) Input/output interface 116 for receiving input data from a keyboard 118 and a mouse 120;

(h) Display controller 122 working as an interface for transferring image data to a color CRT 124; and (i) Image input/output interface 126 for receiving picture data from the color scanner 200 and linework data from the black-and-white scanner 300, and supplies the picture data and linework data to the dot signal generator 400.

FIGS. 3(A) through 3(D) show the structure of linework data. As shown in FIG. 3(A), linework data comprises a linework data management part, a color palette part, and a run length data part. The linework data management part includes data representing a size of a linework, a resolution, and a file name.

The color palette part includes dot percentages of the four colors and picture priority flags Fy, Fm, Fc, and Fk for yellow, magenta, cyan and black for each color number as shown in FIGS. 3(B) and 3(C). The value "1" of the picture priority flag for each color indicates that the picture data has priority over the linework data in the color separation whereas the value '0' indicates that the linework data has priority over the picture data. Data in the color palette part (hereinafter simply referred to as "color palette") are to be stored in the RAM 108 (FIG. 2).

Figure 4:
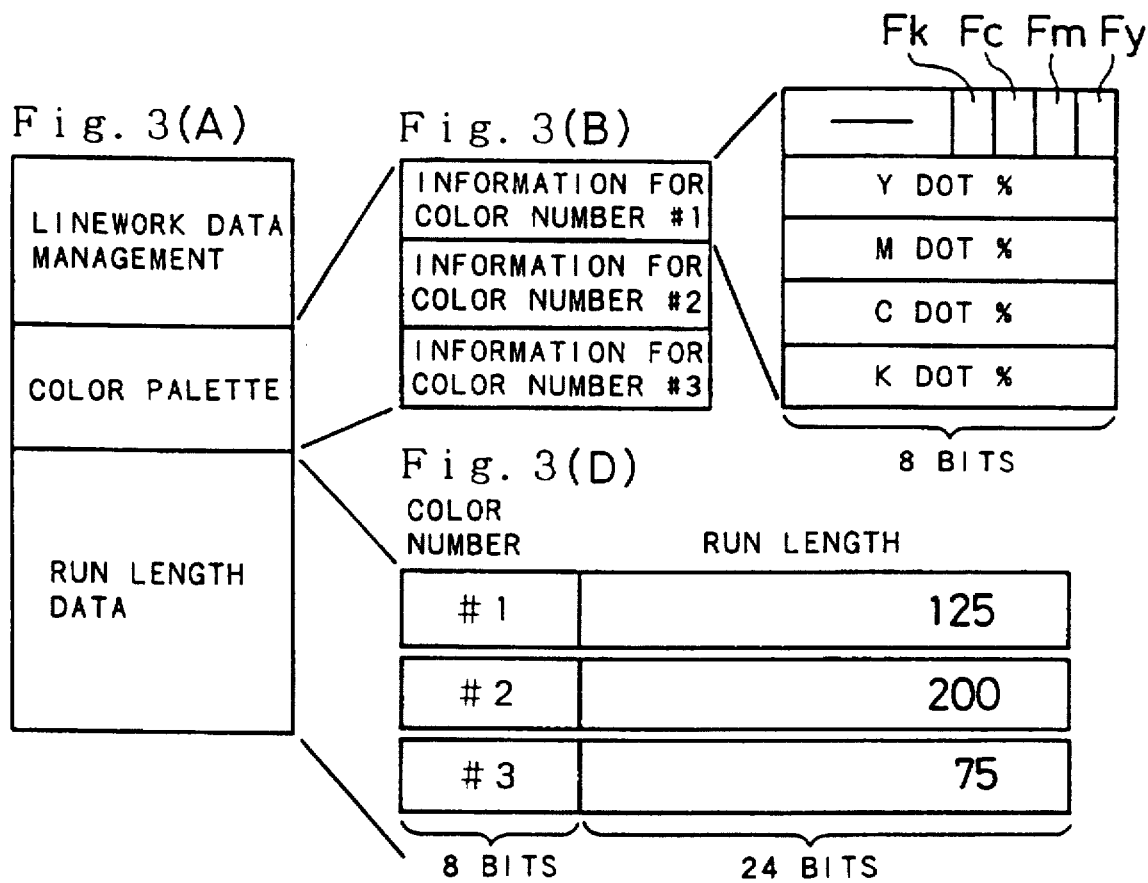
FIG. 4 shows contents of a color palette.

FIG. 4 shows an exemplified relationship between color numbers and dot percentages of four process colors registered in a color palette CP. An image area having a color number #1 has 100 dot percent for magenta and 0 dot percent for the other three colors. A symbol '1' in the color palette CP indicates that the picture priority flag of the color separation has the value '1'. In the example of FIG. 4, the picture data has priority over linework data for all of the four color separations in an image area having a color number #2.

The run length data part of each linework data includes run length data as typically shown in FIG. 3(D). One unit of run length data (hereinafter referred to as "unit run length data") includes a run length and a color number for each run in the linework. FIG. 3(D) shows three consecutive unit run length data on the same scanning line.

Figure 5A:
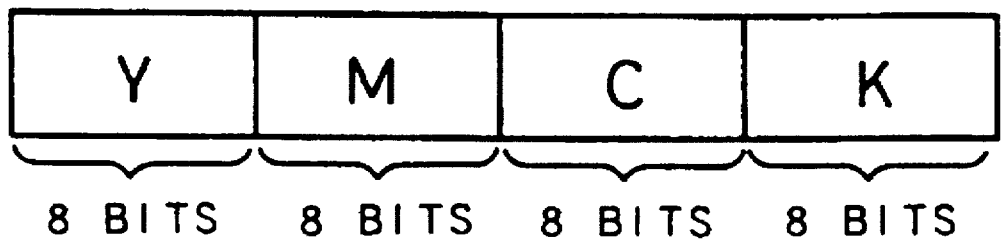
FIGS. 5(A) and 5(B) show a typical structure of picture data.
Figure 5B:
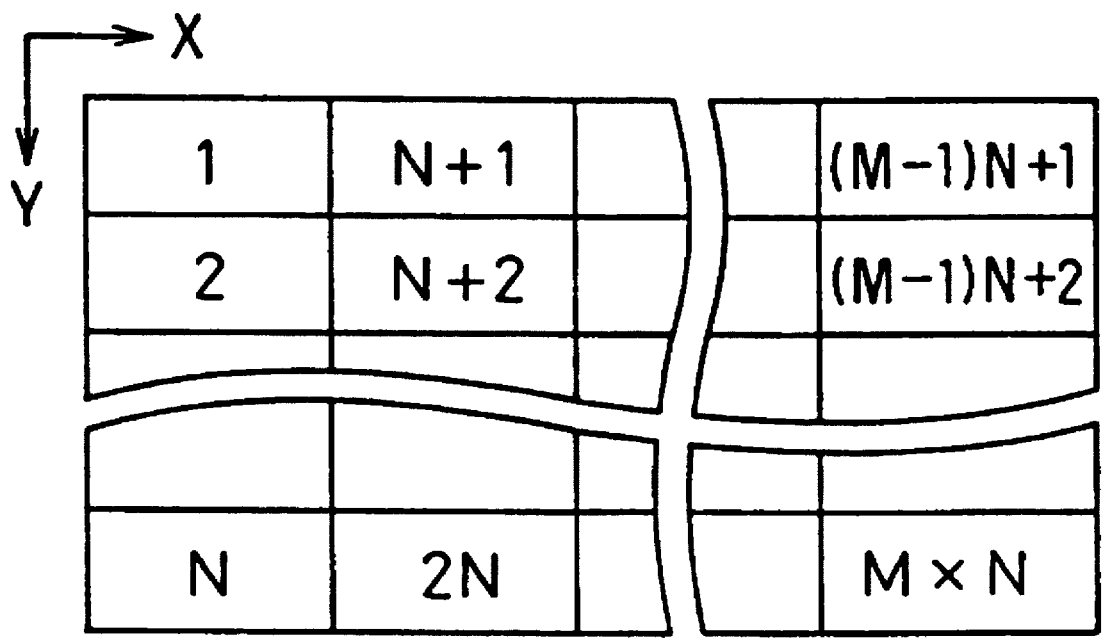

FIG. 5(A) shows picture data for one pixel, which includes data representing dot percentages of the four color separations. FIG. 5(B) shows a pixel arrangement of picture data on an image plane. Pixels are arranged in the order of scanning in a primary scanning direction Y, and the data shown in FIG. 5(A) are stored according to this arrangement in the picture memory 114.

C. Processing Procedure

Figure 6:
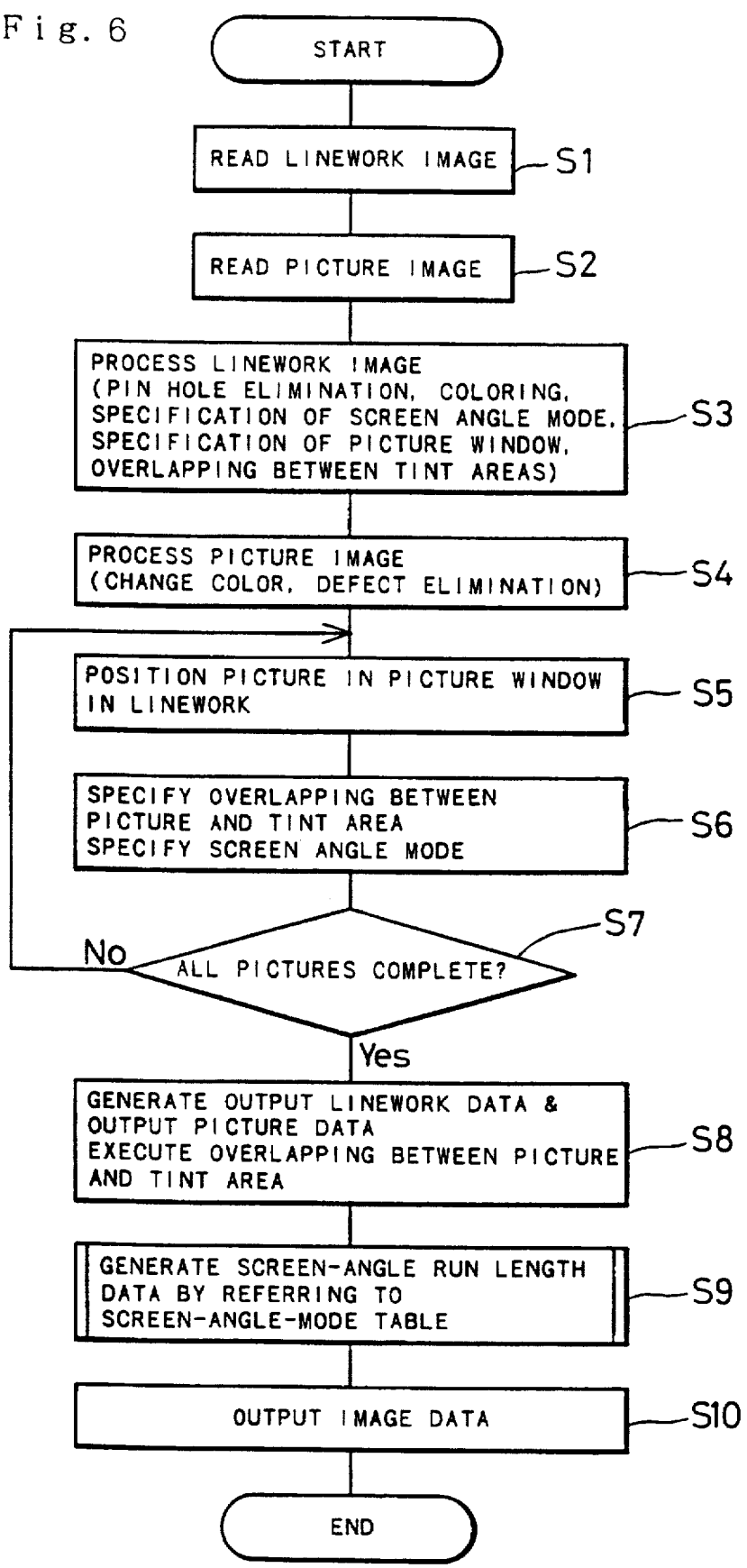
FIG. 6 is a flowchart showing an image processing routine executed in the embodiment.

FIG. 6 is a flowchart showing an image processing procedure to be executed in the embodiment. The linework image is captured by the black-and-white scanner 300 at step S1, and a plurality of pictures are captured by the color scanner 200 at step S2.

At step S3, the CPU 102 executes predetermined processes including pin-hole elimination, specification of a plurality of picture windows, overlapping between adjacent tint areas, coloring, and specification of screen angle modes for the linework captured at step S1. A picture window denotes an area in the linework image in which a picture is fitted. The operator specifies a closed-loop figure, such as a circle and a rectangle, in the linework image captured by the black-and-white scanner 300 as the shape of the picture window, or alternatively inputs the shape of the picture window directly with the mouse 120. The picture priority flags Fk, Fc, Fm, and Fy shown in FIG. 3(C) are set equal to one for the linework data in the picture window.

Figures 7A, 7B:
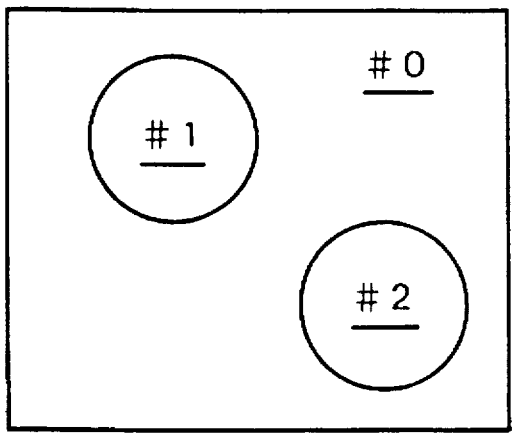
FIGS. 7(A) and 7(B), show an exemplified setting of screen angle modes.

The screen angle mode, which is specified at step S3, indicates how to determine screen angles, and it is specified for each image area in the linework. FIGS. 7(A) and 7(B) show an exemplified setting of screen angle modes. In an example of FIG. 7(A), a color number #0 is assigned to a background area and color numbers #1 and #2 are respectively allocated to two circular tint areas by the coloring process. The screen angle mode is set for each color number because color of each image area is represented by a color number in this embodiment. FIG. 7(B) shows a first screen-angle-mode table Twa for lineworks where a screen angle mode Ms is registered for each color number. The screen angle mode Ms=0 indicates "Standard Mode" where the standard screen angles of magenta and cyan are to be maintained. The screen angle mode Ms=1 indicates "CM Exchange Mode" where the screen angles of magenta and cyan are to be exchanged. The screen angle mode Ms=1 indicates "Auto Mode" where the screen angles of magenta and cyan are automatically determined according to the conditions of the expressions (1a) through (1d) described before. The Auto Mode (Ms=2) is assigned when the dot percentage of magenta is greater than that of cyan.

Figures 8A, 8B, 8C:
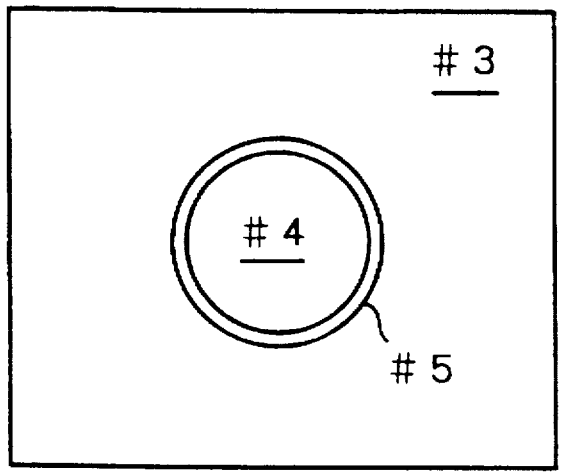
FIGS. 8(A) through 8(C) show an exemplified setting of screen angle modes in a case of overlaying between different tint areas.

FIGS. 8(A) through 8(C) show an exemplified setting of screen angle modes in an overlapping area between adjacent tint areas. As shown in FIG. 8(A), color numbers #3, and #5 are respectively allocated to a background image area, a circular image area, and an overlapping area of a ring shape. FIG. 8(B) shows a color palette where the dot percentages of the four process colors are registered for each color number. The dot percentages of each color separation in the overlapping area, which has the color number #5, is determined such that the greater of the dot percentages of the two image areas adjacent to the overlapping area is selected; for example, the dot percentage of yellow for the color number #5 is determined to be 100% because the dot percentage of yellow is 100% for the color number #3 and 0% for #4. FIG. 8(C) shows a second screen-angle-mode table Twb for overlapping linework areas. The second screen-angle-mode table Twb includes the color number #5 assigned to the overlapping area, the original color numbers N0=#3 and Nl=#4 of the two original image areas of the overlapping area, that is, of the two adjacent image areas, and screen angle reference numbers. The screen angle reference number for each of cyan and magenta indicates one of the two original color numbers N0 and N1 whose screen angle of the corresponding color is applied to the overlapping area. As shown in FIG. 8(B), the dot percentage of cyan in the overlapping area, which has the color number #5, is set equal to the dot percentage for the color number #4, and the screen angle reference number for cyan is thus set equal to "1" representing the original color number N1 corresponding to the color number #4 as shown in FIG. 8(C). Namely, the screen angle of the cyan separation in the overlapping area is set equal to the screen angle at the area which has the original color number Nl=#4. The dot percentage of magenta in the overlapping area is set equal to the dot percentage for the color number #3 as shown in FIG. 8(B), and the screen angle reference number for the magenta separation is thus set equal to "0" representing the original color number NO corresponding to the color number #3. Namely, the screen angle of magenta in the overlapping area is set equal to the screen angle of the image area which has the original color number N0=#3.

At step S4 (FIG. 6), various processes such as color change and elimination of defects are executed on the picture images. At steps S5 through S7, each picture is fit in one of the picture windows in the linework as follows. At step S5, one picture is selected out of the plurality of pictures and then positioned in one of the plurality of picture windows in the linework. At step S6, an overlapping process between the selected picture and a tint area is specified while a screen angle mode is specified for the selected picture window. FIGS. 9(A) and 9(B) show screen angle modes applied to three picture windows. The three picture windows in FIG. 9(A) have the color numbers of #10, #11, and #12, respectively. The picture priority flag of the picture windows are always turned on because the picture priority flag indicates that a picture has a priority over a linework in the area and because pictures must have priority over a linework in the picture windows. According to the specification of screen angle mode at step S6, a third screen angle-mode-table Tpa for pictures is produced as shown in FIG. 9(B), where the color number of each picture window is correlated with the specified screen angle mode Ms. The screen angle mode Ms of the third table Tpa is the same as that shown in FIG. 7(B). At step S7, it is determined whether the positioning of all the pictures are completed. When the positioning is not completed, the procedure returns to step S5 to repeat the processing of steps S5 and S6.

At step S8, output linework data and output picture data are produced and the overlapping process between the selected picture and the tint area is executed as specified at step S6. The "output linework data" and the "output picture data" are the image data which are to be supplied from the image processing apparatus 100 to the dot signal generator 400 to reproduce a halftone image with the recording scanner 500.

FIGS. 10(A) through 10(C) show an exemplified setting of screen angle modes when the overlapping process is executed between a selected picture and a tint area. As shown in FIG. 10(A), color numbers #13, #14, and #15 are respectively allocated to a background image area, a circular picture window, and an overlapping area. FIG. 10(B) shows a color palette where dot percentages of the four color separations are registered for each color number. The symbol 'I' written in the color number #14 shows that the picture priority flag is set equal to one to the picture window. FIG. 10(C) shows a fourth screen- angle-mode table Tpb for overlapping picture areas. The fourth screen angle mode table Tpb includes the color number #15 for the overlapping area, original color numbers N0=#13 and Nl=#14 of the two original areas of the overlapping area, and screen angle reference numbers. Since the picture priority flag "I" for magenta of the color number #14 is applied to the overlapping area as shown in FIG. 10(B), the screen angle reference number for the magenta separation is thus set equal to "1" representing the original color number N1 corresponding to the color number #14 as shown in FIG. 10(C). Namely, the screen angle of magenta in the overlapping area is set equal to the screen angle of the area having the original color number Nl=#14. The dot percentage for cyan of the color number #13 is, on the other hand, applied to the overlapping area, and the screen angle reference number for the cyan separation is thus set equal to "0" representing the original color number N0 corresponding to the color number #13. Namely, the screen angle of the cyan separation in the overlapping area is set equal to the screen angle of the area having the original color number N0=013.

The first through the fourth screen-angle-mode tables Twa, Twb, Tpa, and Tpb shown in FIGS. 7(B), 8(C), 9(B), and 10(C) are generated by the mode table generator unit 102a (FIG. 2) and stored in the RAM 108.

At step S9 of FIG. 6, the screen angle code generator unit 102b generates screen-angle run length data by referring to the first through fourth screen-angle-mode tables Twa, Twb, Tpa, and Tpb. The screen-angle run length data represents a screen angle of each pixel in the form of run length data. It is assumed here that a linework shown in FIG. 11(A) is prepared according to the processing at steps S1 through S8. In the example of FIG. 11(A), a color number #0 is allocated to the background area; color numbers #1 through #6 to tint areas; color numbers #7 through #9 to overlapping areas each between tint areas; color numbers #10 through #15 to picture windows; and color numbers #16 through #18 to overlapping areas, which are formed between a picture and a tint area. The color numbers #0 through #18 used in FIG. 11 have nothing to do with the color numbers used in FIGS. 7(A) through 10(C).

Figure 12:
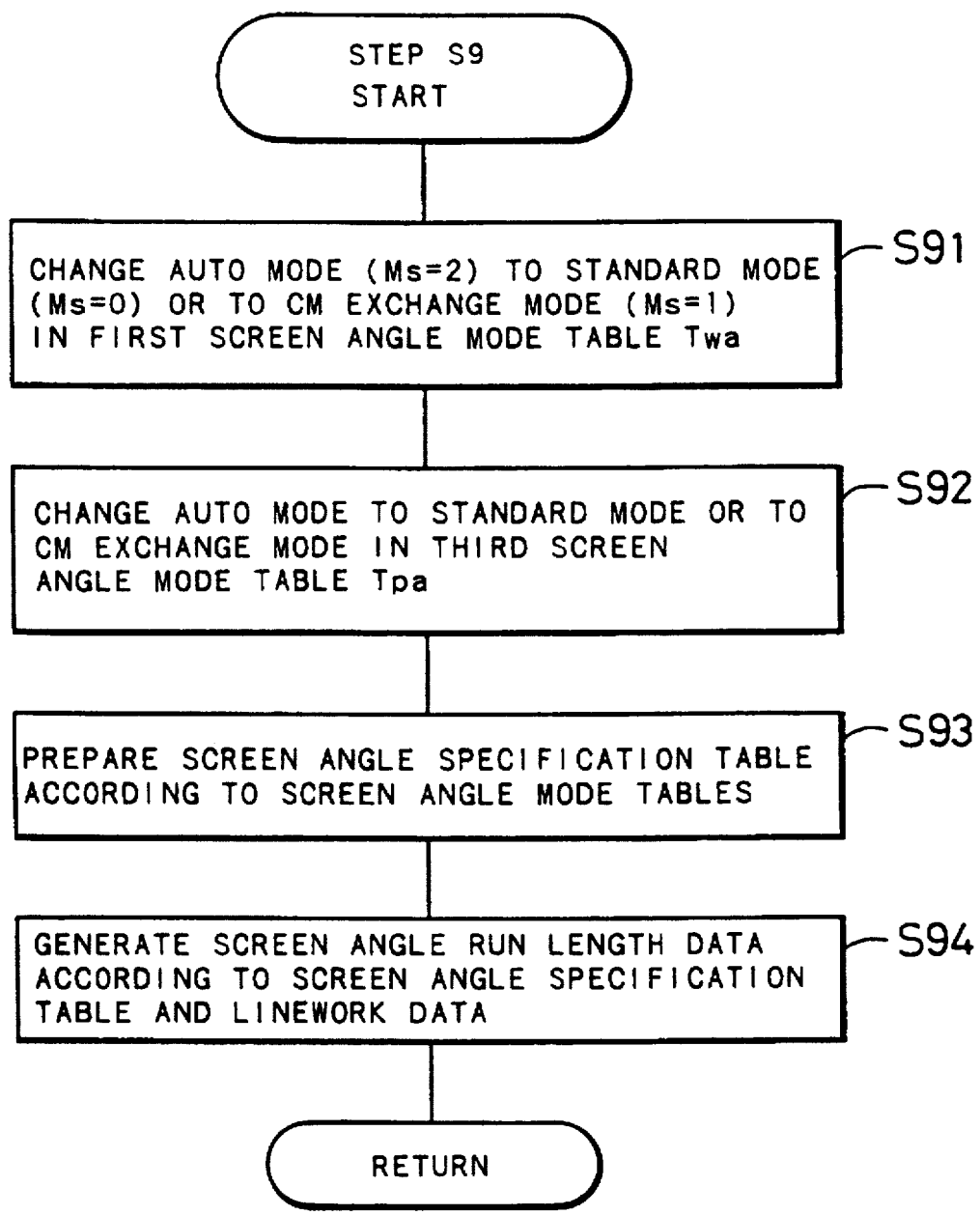
FIG. 12 is a flowchart showing details of the processing executed at step S9 in the flowchart of FIG. 6.

FIG. 12 is a flowchart showing the details of the step S9 in FIG. 6. At step S91, the conditions of the expressions (1a) through (1d) described before are examined, and the screen angle mode Ms in the first screen-angle-mode table Twa for lineworks is changed from the Auto Mode (Ms=2) to the Standard Mode (Ms=0) or to the CM Exchange Mode (Ms=1) accordingly. The Auto Mode is changed to the Standard Mode when the conditions of "D(M)≠100% and D(M)>D(C)" or "D (M≠100% and D(C) =100%" hold for the color number, where D(M) and D(C) represent the halftone dot area rates of magenta and cyan separations, respectively. The Auto Mode i s changed to the CM Exchange Mode, on the contrary, when the conditions of "D (C)≠100% and D (M)<D (C)" or "D (M) =100%" hold for the color number. In a first screen-angle-mode table Twa shown in FIG. 11(B), for example, the screen angle mode Ms is changed from the Auto Mode (Ms=2) to the Standard Mode (Ms=0) for the color number #3 and to the CM Exchange Mode (Ms=1) for the color number #6.

At step S92 of FIG. 12, the Auto Mode in the third screen-angle-mode table Tpa for pictures is changed to the Standard Mode or to the CM Exchange Mode according to the conditions of the expressions (1a) through (1d). In a third screen-angle-mode table Tpa shown in FIG. 11(D), for example, the Auto Mode is changed to the Standard Mode for the color number #12 and to the CM Exchange Mode for the color number #15. The conditions of the expressions (1a) through (1d) are examined for each pixel of a picture image in the picture window, and the CM Exchange Mode is accordingly established for the picture image area in which a majority of the pixels are under the screen angle exchange condition, that is, D (M)<D (C), while the Standard Mode is established for the other picture image areas.

At step S93, a screen angle specification table shown in FIG. 13 (A) is prepared by referring to the four screen-angle-mode tables Twa, Twb, Tpa, and Tpb shown in FIGS. 11(B) through 11(E). The screen angle specification table shows a screen angle code Cs which indicates screen angles of cyan and magenta separations with respect to each color number included in the linework data. Each screen angle code Cs is a 2-bit data consisting of an upper bit indicating the screen angle of the cyan separation and a lower bit indicating the screen angle of the magenta separation. As shown on the bottom of FIG. 13(A), the screen angle is set equal to 15° if Cs=0, and 45° if Cs=1.

The screen angle codes Cs are first established for the color numbers of the areas other than the overlapping areas while referring to the first and third screen angle mode tables Twa and Tpa shown in FIGS. 11(B) and 11(D). In the areas other than the overlapping areas, that is, in the background area, the tint areas and the the picture windows, which have the color numbers #0 through #6 and #10 through #15, the screen angles are determined directly from the screen angle mode Ms because the screen angle mode Ms has been corrected to be the Standard Mode or the CM Exchange Mode at steps S91 and S92. The screen angle code Cs is set equal to zero for cyan and equal to one for magenta with respect to the color numbers of the Standard Mode (Ms=0) in the tables Twa and Tpa shown in FIGS. 11(B) and 11(D). The screen angle code Cs is set equal to one for cyan and equal to zero for magenta, on the other hand, with respect to the color numbers of the CM Exchange Mode (Ms=1) in the tables Twa and Tpa of FIGS. 11(B) and 11(D). Thus the screen angle specification table is provided as shown in FIG. 13(A).

The screen angle codes Cs are then established for the color numbers of the overlapping areas while referring to the second and fourth screen-angle-mode tables Twb and Tpb shown in FIGS. 11(C) and 11(E). The second screen-angle-mode table Twb of FIG. 11(C) indicates, for example, that the screen angle of the cyan separation for the color number #7 is identical with that for the original color number Nl=#4. Accordingly, the screen angle code Cs of the cyan separation for the color number #7 is copied from that for the color number #4 in the screen angle specification table as shown in FIG. 13(B). The second screen-angle-mode table Twb of FIG. 11(C) further indicates that the screen angle of the magenta separation for the color number #7 is identical with that for the original color number N0=#0. Accordingly, the screen angle code Cs of the magenta separation for the color number #7 is copied from that for the color number #0 as shown in FIG. 13(B). The screen angle specification table shown in FIG. 13(B) is thus generated by determining the screen angle code Cs for each of the color numbers allocated to the overlapping areas.

Figure 14:
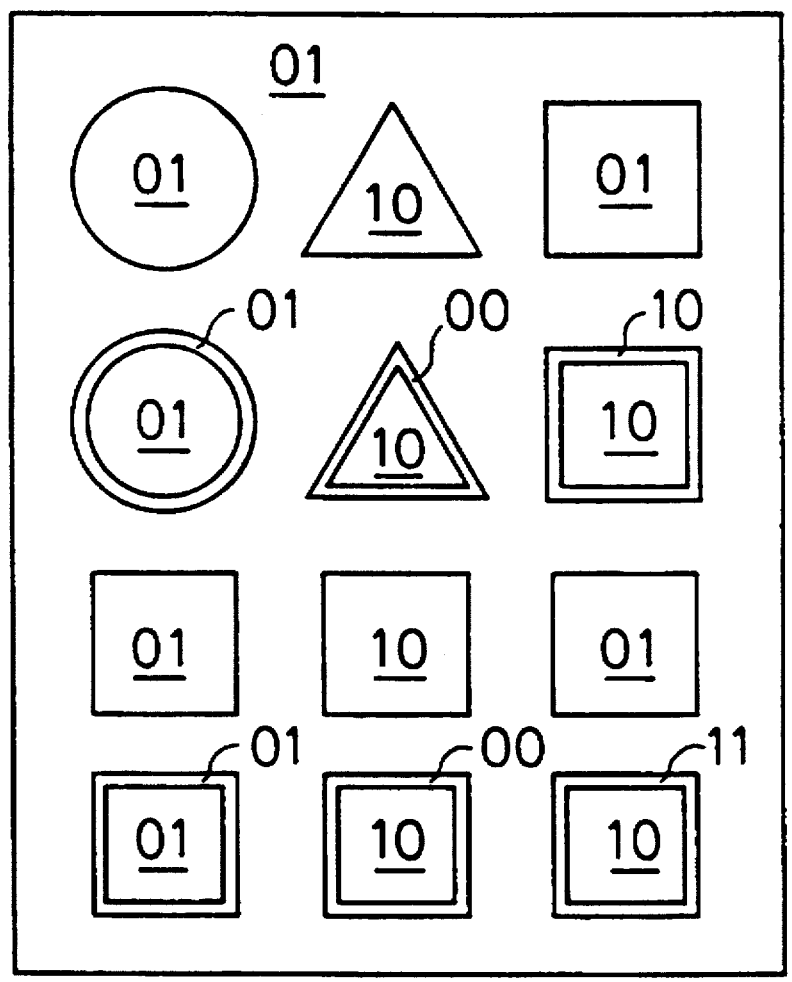
FIG. 14 shows a distribution of 2-bit screen angle data expressed by screen angle run length data.

At step S94 of FIG. 12, screen-angle run length data is generated from the screen angle specification table of FIG. 13(B) and the linework data. The screen-angle run length data represents run lengths of screen angle code Cs in the linework image. The screen-angle run length data is prepared in the following manner: first, run length data of the linework shown in FIG. 3(D) are read out of the linework memory 110; and second, each color number in the run length data is replaced by a screen angle code Cs shown in FIG. 13(B). FIG. 14 shows a distribution of the 2-bit screen angle codes Cs expressed by the screen-angle run length data. The screen-angle run length data are stored in the screen angle information memory 112 whereas run length data representing the overlapping areas are stored in an supplementary memory (not shown) in the CPU 102.

After generating the screen-angle run length data at step S94, the program proceeds to step S10 of FIG. 6, at which final image data including the output linework data, the output picture data, and the screen-angle run length data are output from the image processing apparatus 100 to the dot signal generator 400 to record halftone images with the recording scanner 500.

Figure 15:
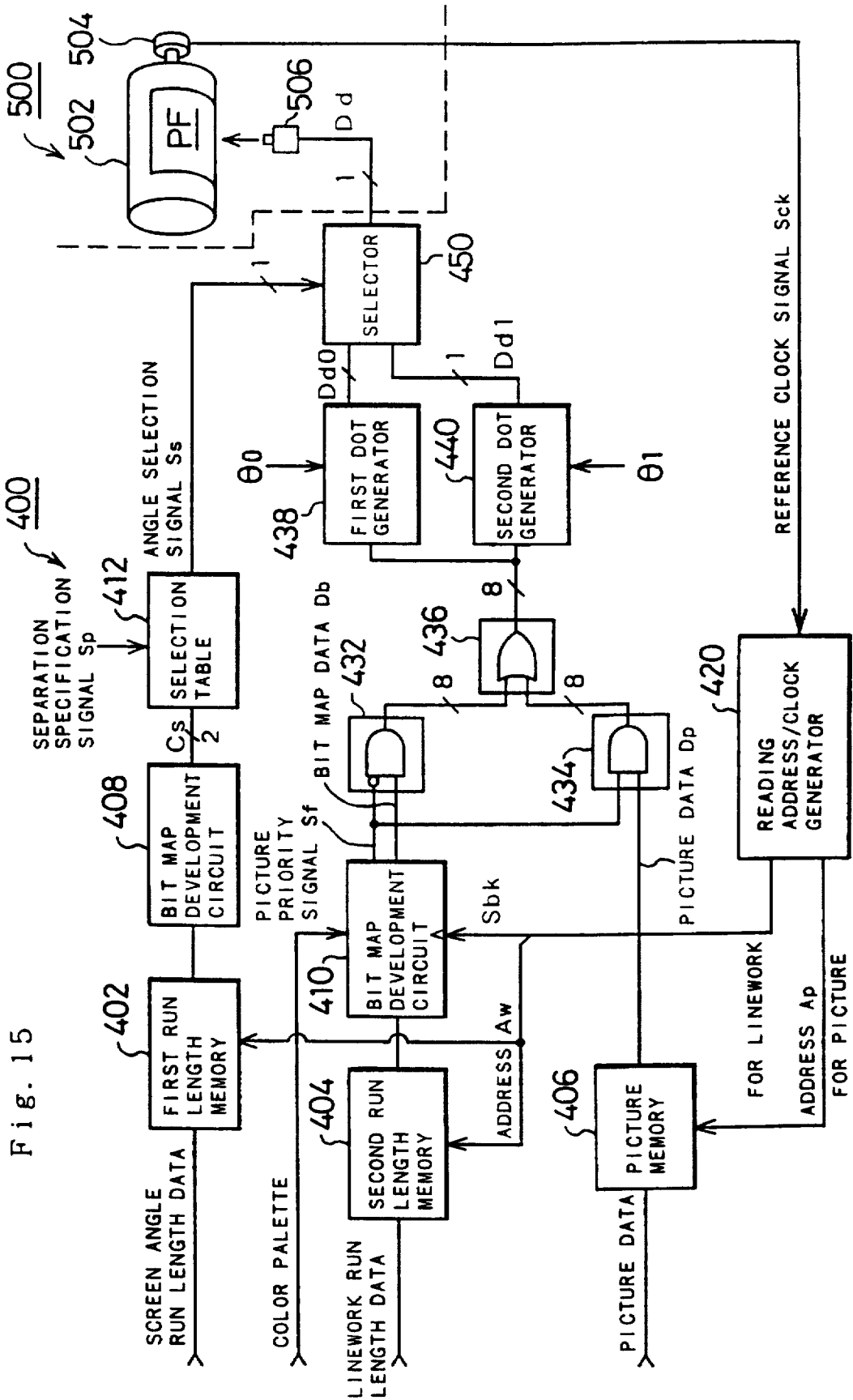
FIG. 15 is a block diagram showing main internal structures of a dot signal generator and a recording scanner.

FIG. 15 is a block diagram showing the main internal structure of the dot signal generator 400 and the recording scanner 500. The screen-angle run length data supplied to the dot signal generator 400 are stored in a first run length memory 402 while the run length data in the linework data are stored in a second run length memory 404 and the picture data are stored in a picture memory 406. The run length data stored in the first and the second run length memories 402 and 404 are respectively developed to bit map data by first and second bit map development circuits 408 and 410.

The 2-bit screen angle code Cs (FIG. 14), which is developed to be bit map data in the first bit map development circuit 408, is converted to a 1-bit angle selection signal Ss by a selection table 412. FIG. 16(A) shows contents of the selection table 412. The level of the angle selection signal Ss is separately determined from the screen angle code Cs for each of the color separations of Y, M, C, and K. In other words, the selection table 412 is divided into four components corresponding to four process colors, respectively. For the yellow and the black separations, the angle selection signal Ss is always equal to zero regardless of the value of the screen angle code Cs. In the case of the magenta separation, the angle selection signal Ss is equal to one for the values '01' and '11' of the screen angle code Cs and equal to zero for the values '00' and '10' of the screen angle code Cs. Namely, the lower bit of the screen angle code Cs corresponds to the angle selection signal Ss for the magenta separation. For the cyan separation, on the contrary, the upper bit of the screen angle code Cs corresponds to the angle selection signal Ss. One of that four components of the selection table 412, which correspond to the four process colors, is selected in response to a separation specification signal Sp supplied from the recording scanner 500 to the selection table 412.

An encoder 504 attached to a recording drum 502 of the recording scanner 500 outputs a reference clock signal Sck in synchronism with rotation of the recording drum 502 to a reading address/clock generator 420 in the dot signal generator 400. The reading address/clock generator 420 generates a clock signal Sbk to be supplied to the first and the second bit map development circuits 408 and 410, a reading address Aw to be supplied to the first and the second run length memories 402 and 404, and a picture reading address Ap to be supplied to the picture memory 406. If the run length data stored in the first and the second run length memories 402 and 404 have the same resolution as the picture data stored in the picture memory 406, the picture reading address Ap is equal to the reading address Aw for the run length data.

In this embodiment, a side length of each pixel in a linework is one fifth of that of each pixel in a picture. In other words, the resolution of lineworks is five times greater than that of pictures. A pixel in a linework and a pixel in a picture are herein referred to as "picture pixel" and "picture pixel", respectively. A scanning line in a linework and a scanning line in a picture are herein referred to as "linework-scanning-line" and "picture scanning line", respectively.

The picture data are read out of the picture memory 406 so that the resolution of the read-out picture data becomes equal to that of the linework data. In order to equalize the resolutions, the picture data for one picture-scanning-line is read out of the picture memory 406 while the run length data for five linework-scanning-lines are read out in parallel from the first and the second run length memories 402 and 404, respectively. While run length data corresponding to five linework pixels on one picture-scanning-line are developed to bit map data in the second bit map development circuit 401, picture data corresponding to one picture pixel is read out five times from the picture memory 406. Thus the bit map data corresponding to 5×5 linework pixels are obtained in synchronism with twenty-five times of reading of the same picture data for one picture pixel from the picture memory 406. Actually, run length data for ten linework-scanning-lines are simultaneously read out in parallel while picture data for two picture-scanning-lines are read out in the above manner.

The second bit map development circuit 410 converts the linework run length data to pixel data as a function of the color palette. The linework data in the form of the bit map data has a structure similar to that of the picture data shown in FIG. 5. The second bit map development circuit 410 outputs bit-map linework data Db (hereinafter simply referred to as "bit map data") and a picture priority signal Sf, which represents the picture priority flags Fy, Fm, Fc, and Fk shown in FIG. 3(C).

The picture priority signal Sf is inverted to be input into a first AND gate unit 432, and the linework bit map data Db is directly input into the first AND gate unit 432. The first AND gate unit 432 actually includes a certain number of AND gates corresponding to the number of bits of the bit map data Db for one color separation, but it is simplified in FIG. 15 for convenience of illustration. When the picture priority signal Sf is equal to one, indicating that the picture data has a priority over the linework data, the outputs of the first AND gate unit 432 become all zero. When the picture priority signal Sf is equal to zero, on the other hand, the first AND gate unit 432 outputs the bit map data Db itself.

A second AND gate unit 434 is supplied with the picture priority signal Sf and the picture data Dp. The second AND gate unit 434 outputs the picture data Dp when the picture priority signal Sf is equal to one. The outputs of the second AND gate unit 434 become all zero, on the other hand, when the picture priority signal Sf is equal to zero.

Outputs of the first and the second AND gate units 432 and 434 are input into an OR gate unit 436. One of the linework bit map data Db and the picture data Dp is input into the OR gate unit 436 according to the value of the picture priority signal Sf. The outputs of the OR gate unit 436 are subsequently supplied to first and second dot signal generators 438 and 440. These dot signal generators 438 and 440 can generate screen pattern data of arbitrary screen angles, and internally generate screen patterns corresponding to screen angles specified by screen angle signals $\theta_0$ and $\theta_1$, respectively, which are given from an external circuit. The circuit for generating screen pattern data of arbitrary screen angles is disclosed, for example, in U.S. Pat. Nos. 4,499,489 and 4,673,971, the disclosure of which is incorporated by reference hereby.

The screen angles specified by the screen angle signals $\theta_0$ and $\theta_1$ are different for each of the color separations Y, M, C, and K. FIG. 16(B) shows values of the screen angle signals $\theta_0$ and $\theta_1$ for each color separation. The first and the second dot signal generators 438 and 440 generate screen pattern data corresponding to the screen angles $\theta_0$ and $\theta_1$, respectively, and compare the screen pattern data with image data supplied from the OR gate unit 436 to thereby generate first and second dot signals Dd0 and Dd1 at the screen angles $\theta_0$ and $\theta_1$, respectively. Each of the dot signals Dd0 and Dd1 is a 1-bit signal showing ON/OFF of an exposure beam with respect to each pixel.

The two dot signals Dd0 and Dd1 are supplied to a selector 450, which selects one of the two dot signals Dd0 and Dd1 in response to the angle selection signal Ss given from the selection table 412. Since the level of the angle selection signal Ss is always equal to zero for the yellow separation as shown in FIG. 16(A), the selector 450 always selects the first dot signal Dd0 of a screen angle $\theta_0=0°$ for the yellow separation. The selector 450 also selects the first dot signal Dd0 of a screen angle of $\theta_0=75°$ for the black separation. The level of the angle selection signal Ss is equal to one or zero for the magenta and the cyan separations. The first and the second screen angle signals $\theta_0$ and $\theta_1$ indicate 15° and 45°, respectively, for both of the magenta and the cyan separations. The selector 450 selects either the first dot signal Dd0 of $\theta_0=15°$ or the second dot signal Dd1 of $\theta_1=45°$ in response to the level of the angle selection signal Ss. In short, the selector 450 selects a dot signal Dd of $\theta_0=15°$ or $\theta_1=45°$ in response to the screen angle code Cs for the magenta and the cyan separations.

An exposure head 506 of the recording scanner 500 modulates a laser beam in response to the dot signal Dd supplied from the selector 450 and records a halftone image on the photosensitive film PF mounted on the recording drum 502.

Combining linework data with picture data may be implemented according to a method and an apparatus disclosed in U.S. Pat. Nos. 4,628,366, 4,553,172, and 4,626,902, the disclosure of which is incorporated by reference hereby.

In the Auto Mode of the above embodiment, the dot percentage of the magenta separation is compared with that of the cyan separation for each image area, and the screen angle of the magenta separation is set equal to 45° for those image areas whose dot percentage of the magenta separation is greater than that of the cyan separation whereas the screen angle of the cyan separation is set equal to 45° for those image areas whose dot percentage of the cyan separation is greater than that of the magenta separation. Accordingly, one of the cyan separation and the magenta separation which has a greater dot percentage becomes more indistinctive in a reproduced image. For those image areas whose dot percentage of the cyan separation is greater than that of the magenta separation, that is, for image areas with much green in color, the difference in the screen angle between the yellow separation and the cyan separation is equal to 45°, which effectively prevents a moire due to interference of the yellow and cyan separations. An undesirable moire is also prevented in those image areas whose dot percentage of the magenta separation is greater than that of the cyan separation, that is, in skin-colored or orange-colored image areas.

D. Another Method of Setting Screen Angles

Each tint area can be painted with one or a plurality of process colors selected out of the four primary colors Y, M, C, and K, or with all of the four primary colors. This section describes a method of determining screen angles according to process colors to be painted in the tint area.

For the tint areas which are to be painted with only one process color whose dot percentage is not equal to 100%, the screen angle of the color separation is set equal to 45° as clearly shown in the following Table 1:

TABLE 1

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y | N/A | 45 | — | — | — |
| M | N/A | — | 45 | — | — |
| C | N/A | — | — | 45 | — |
| K | N/A | — | — | — | 45 | where "N/A" means that there are no conditions for the relations among the dot percentages D(Y), D(M), D(C), and D(K).

Although no moire is seen in the image area painted with only one process color Y, M, C, or K, the screen angle of 45° makes the screen structure sufficiently indistinctive and enhances the sharpness of the edge of the image area. The same effects can be attained even if one or more process colors having a dot percentage of 100% are also painted in the image area. This is also applicable to two-colored or three-colored tint areas described below.

For the tint-areas which are painted with two process colors whose dot percentage is not equal to 100%, the screen angle of each color separation is set preferably according to the following Table 2:

TABLE 2

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y and M | N/A | 0 | 45 | — | — |
| Y and C | N/A | 0 | — | 45 | — |
| Y and K | N/A | 0 | — | — | 45 |
| M and C | D(M) > D(C) | — | 45 | 0 | — |
| M and C | D(M) ≤ D(C) | — | 0 | 45 | — |
| M and K | D(M) > D(K) | — | 45 | — | 0 |
| M and K | D(M) ≤ D(K) | — | 0 | — | 45 |
| C and K | D(C) > D(K) | — | — | 45 | 0 |
| C and K | D(C) ≤ D(K) | — | — | 0 | 45 |

Since magenta, cyan, and black are more distinctive than yellow, in the tint areas which are painted with two process colors including yellow, the screen angle of the separation other than the yellow separation, that is, magenta, cyan, or black separation, is set equal to 45° whereas the screen angle of the yellow separation is set equal to 0°. The difference of 45° between the screen angles oft the two color separations sufficiently prevents an undesirable moire. In the two-colored tint area which are not painted with yellow, the screen angle of one color separation of the greater dot percentage is set equal to 45° while the screen angle of the other color separation of the smaller dot percentage is set equal to 0°. The difference of 45° in the screen angles effectively prevents the moire in a reproduced color print.

The screen angles can be set according to the following Table 2a instead of Table 2:

TABLE 2a

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y and M | N/A | 0 | 45 | — | — |
| Y and C | N/A | 0 | — | 45 | — |
| Y and K | N/A | 0 | — | — | 45 |
| M and C | D(M) > D(C) | — | 45 | 15 | — |
| M and C | D(M) ≤ D(C) | — | 15 | 45 | — |
| M and K | D(M) > D(K) | — | 45 | — | 75 |
| M and K | D(M) ≤ D(K) | — | 15 | — | 45 |
| C and K | D(C) > D(K) | — | — | 45 | 75 |
| C and K | D(C) ≤ D(K) | — | — | 15 | 45 |

In Table 2a, the screen angles of 0° in Table 2 are replaced with the standard screen angles θ(Y)=0°, θ(M)=45° or 15°, θ(C)=15° or 45°, and θ(K)=75°, respectively. For the tint areas which are painted with two process colors including yellow, the screen angle of the color separation other than yellow can be set equal to 45° while the screen angle of the yellow separation is set equal to 15° or 75° in place of 0°.

In the tint areas which are painted with three process colors all of whose dot percentages are not equal to 100%, the screen angle of each separation is determined preferably according to the following Table 3:

TABLE 3

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y, M and C | D(M) > D(C) | 75 | 45 | 15 | — |
| Y, M and C | D(M) ≤ D(C) | 75 | 15 | 45 | — |
| Y, M and K | D(M) > D(K) | 75 | 45 | — | 15 |
| Y, M and K | D(M) ≤ D(K) | 75 | 15 | — | 45 |
| Y, C and K | D(C) > D(K) | 75 | — | 45 | 15 |
| Y, C and K | D(C) ≤ D(K) | 75 | — | 15 | 45 |
| M, C and K | D(M) > D(C) & D(M) > D(K) | — | 45 | 15 | 75 |
| M, C and k | D(C) ≥ D(M) & D(C) > D(K) | — | 15 | 45 | 75 |
| M, C and k | D(K) ≥ D(M) & D(K) ≥ D(C) | — | 15 | 75 | 45 |

Under the conditions of Table 3, the screen angle of the color separation which has the greatest dot percentage and which is not the yellow separation is set equal to 45°, and the difference in the screen angles between any two of the three separations is maintained at 30°. This effectively prevents the moire in a reproduced color print.

The following Table 3a can be used in place of Table 3:

TABLE 3a

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y, M and C | D(M) > D(C) | 15/75 | 45 | 0 | — |
| Y, M and C | D(M) ≤ D(C) | 15/75 | 0 | 45 | — |
| Y, M and K | D(M) > D(K) | 15/75 | 45 | — | 0 |
| Y, M and K | D(M) ≤ D(K) | 15/75 | 0 | — | 45 |
| Y, C and K | D(C) > D(K) | 15/75 | — | 45 | 0 |
| Y, C and K | D(C) ≤ D(K) | 15/75 | — | 0 | 45 |

TABLE 3a-continued

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| M, C and K | D(M) > D(C) & D(M) > D(K) | — | 45 | 15 | 75 |
| M, C and k | D(C) ≧ D(M) & D(C) > D(K) | — | 15 | 45 | 75 |
| M, C and k | D(K) ≧ D(M) & D(K) ≧ D(C) | — | 15 | 75 | 45 | where "15/75" means arbitrary one of 15° and 75°.

In Table 3a, for the three-colored tint areas including the yellow separation, the screen angles of the two color separations other than yellow are set equal to those shown in Table 2.

For the tint-areas which are painted with all the four process colors whose dot percentages are not equal to 100%, the screen angles are determined according to the following Table 4:

TABLE 4

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y, M, C and K | D(M) > D(C) & D(M) > D(K) | 0 | 45 | 15 | 75 |
| Y, M, C and k | D(C) ≧ D(M) & D(C) > D(K) | 0 | 15 | 45 | 75 |
| Y, M, C and k | D(K) ≧ D(M) & D(K) ≧ D(C) | 0 | 15 | 75 | 45 |

Table 4 is obtained by setting the screen angle of the yellow separation θ(Y) equal to 0° and those of the other three separations equal to those defined for the three-colored tint areas of M, C, and K components as shown in Table 3 or Table 3a.

The screen angle of each color separation in picture image areas can be set automatically in the same manner as the four-colored tint areas or linework areas described above. In picture image areas, however, the dot percentage of each separation is not uniform, and a typical dot percentage of each separation will be evaluated according to a predetermined method. For example, a histogram of the dot percentage may be prepared for each separation in a picture image area, and the value of the highest frequency in the histogram will be determined as a typical dot percentage for each separation.

Figures 17A, 17B, 17C, 18:
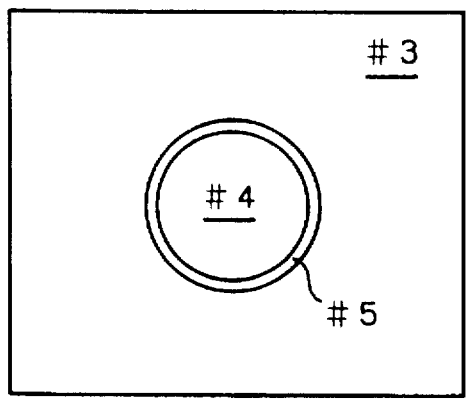
FIGS. 17(A) through 17(C) show a screen angle mode table used for regulating screen angles of all four color plates.
FIG. 18 shows a screen angle specification table used for regulating the screen angles of the four color plates.

FIGS. 17(A) through 17(C), which correspond to FIGs. 8(A) through 8(C), show a screen-angle-mode table used for determining the screen angles of the four color separations. As shown in FIG. 17(C), the screen angle reference numbers are registered for all color separations.

FIG. 18, which corresponds to FIG. 13(B), shows a screen angle specification table used for determining the screen angles of the four color separations. In this case, each screen angle code Cs is an 8-bit data consisting of four 2-bit data each representing the screen angle of Y, M, C, or K.

Figure 19:
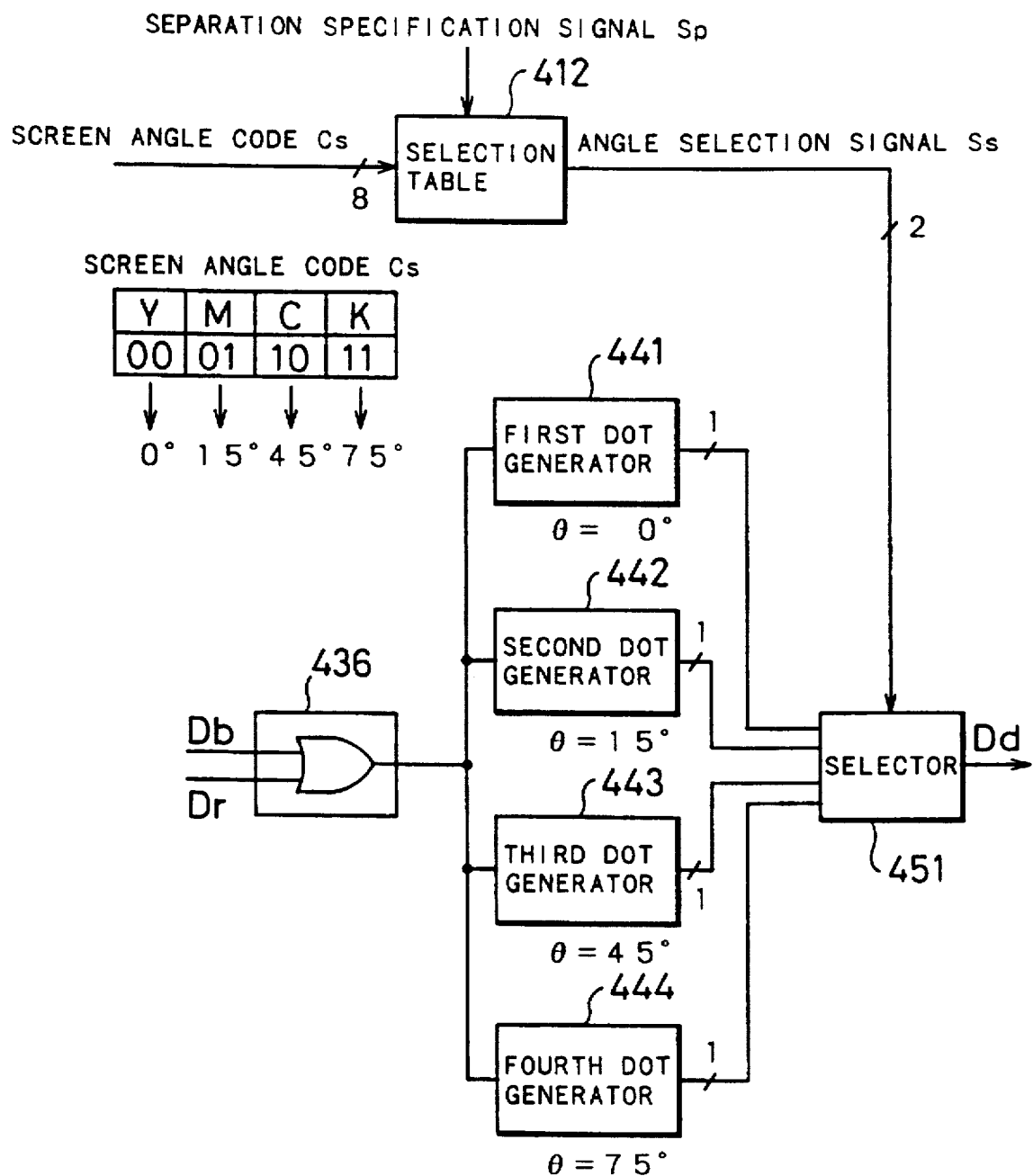
FIG. 19 is a block diagram partially showing an internal structure of another dot signal generator used for regulating the screen angles of all the four color plates.

FIG. 19 is a block diagram showing the internal structure of another dot signal generator 400 used for regulating the screen angles of all the four color separations. In FIG. 19, however, the circuits at the upstream of the selection table 412 and the OR gate unit 436 shown in FIG. 15 are omitted for convenience of illustration. First through fourth dot signal generators 441 through 444 in FIG. 19 compare image data with screen pattern data for screen angles θ of 0°, 15°, 45°, and 75°, respectively, to thereby produce dot signals for the four screen angles. A selector 451 receives the four dot signals of the four screen angles from the dot generators 441–444 accordingly.

The screen angle code Cs used in the circuit of FIG. 19 is an 8-bit data consisting of four 2-bit data each representing a screen angle of each separation Y, M, C, or K as shown in FIG. 18. The screen angle code Cs of "00 01 10 11" shown in FIG. 19 indicates the screen angles of 0°, 15°, 45°, and 75° for Y, M, C, and K separations, respectively. The selection table 412 selects one 2-bit data out of the four 2-bit data in the screen angle code Cs in response to the separation specification signal Sp and outputs the selected 2-bit data as the angle selection signal Ss. The selector 451 receives the 2-bit angle selection signal Ss and selects one of the four dot signals. Use of the dot signal generators shown in FIG. 19 allows the screen angles of the Y, M, C, and K separations to be arbitrarily selected by selecting the value of the screen angle code Cs.

E. Modification

There can be many modifications to the above embodiments as follows:

(1) Although the screen angles are selected from 0°, 15°, 45°, and 75° in the above embodiment, they can be set at other angles. Since both tan 15° and tan 75° are irrational numbers, the method of generating halftone images whose screen angles include 15° and 75° is generally called "Irrational Tangent Method." There is another method where tangents of all the four screen angles are rational numbers, which is called "Rational Tangent Method." In the Rational Tangent Method, for example, angles θa=15.26° and θb=74.74°, whose tangents tanθa=3/11 and tanθb=11/3 are rational numbers, are used as approximate values of 15° and 75°, respectively. The present invention is also applicable to the rational tangent method.

(2) In the above embodiment, the screen angle is determined according to the screen angle code Cs in the form of run length data. This means that the screen angle code defines the screen angle of each color separation for every pixel. Alternatively, the data representing a screen angle may specify the screen angle not for every pixel but for each image area in a whole printing image.

(3) In the above embodiment, the screen angle is adjusted for each image area of a composite image including a linework image and a picture image. The invention is also applicable to the images which include only a linework or a picture image.

(4) Although a hardware structure is used for generating dot signals in the above embodiment, the invention is also applicable to a system for generating dot signals by software software programs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for generating a dot signal for a plurality of color separations to record a halftone image of each color separation, comprising:

area dividing means for dividing a whole image area into a plurality of image areas;

screen angle assigning means for assigning a set of screen angles for said plurality of color separations with respect to each of said plurality of image areas;

a first memory for storing a plurality of color-separated image signals for said plurality of color separations, said plurality of color-separated image signals representing a color image in said whole image area;

a second memory for storing a plurality of screen pattern data for said plurality of color separations;

selection means for selecting one of said plurality of screen pattern data for each color separation in each of said plurality of image areas according to said assigned set of screen angles assigned to each of said plurality of image areas; and a dot signal generator for comparing the selected screen pattern data with the color-separated image data for each separation, to thereby generate a dot signal for recording a halftone image of each color separation, wherein said plurality of color separations include four color separations for yellow, magenta, cyan and black inks and said apparatus, further comprising:

a third memory for storing reference data assigned to an overlapping area, the overlapping area being formed between first and second image areas so that a density of each of four color separations of said overlapping area is equal to one of the first and second image areas, said reference data indicating, with respect to each of the magenta and cyan separations, which one of the two screen angles for the first and second image areas is used as a screen angle of the overlapping area.

2. An apparatus for generating a dot signal for a plurality of color separations to record a halftone image of each color separation, comprising:

area dividing means for dividing a whole image area into a plurality of image areas;

screen angle assigning means for assigning a set of screen angles for said plurality of color separations with respect to each of said plurality of image areas;

a first memory for storing a plurality of color-separated image signals for said plurality of color separations, said plurality of color-separated image signals representing a color image in said whole image area;

a second memory for storing a plurality of screen pattern data for said plurality of color separations;

selection means for selecting one of said plurality of screen pattern data for each color separation in each of said plurality of image areas according to said assigned set of screen angle assigned to each of said plurality of image areas; and a dot signal generator for comparing the selected screen pattern data with the color-separated image data for each separation, to thereby generate a dot signal for recording a halftone image of each color separation, wherein said plurality of color separations include four color separations for yellow, magenta, cyan and black inks and said apparatus, further comprising:

a third memory for storing mode data assigned to each of the plurality of image areas, the mode data representing a first mode where screen angles of the magenta and cyan separations are set at predetermined standard values, and a second mode where the screen angles of the magenta and cyan separations are exchanged each other from the predetermined standard values; and screen angle data generating means for producing the screen angle data of the magenta and cyan separations according to the mode data.

3. An apparatus in accordance with claim 2, wherein a combination of the screen angles of the magenta and cyan separations are 15 degrees and 45 degrees.

4. An apparatus in accordance with claim 2, wherein said screen angle data generating means comprises:

means for determining the screen angles of the magenta and cyan separations so that one of the magenta and cyan separations which has a greater dot percentage but is not equal to 100% has a screen angle of approximately forty-five degrees, and that the other of the magenta and cyan separations has a screen angle of approximately fifteen degrees.

5. An apparatus in accordance with claim 4, wherein the screen angle data further indicates that a screen angle of a yellow separation is equal to approximately zero degrees, and that a screen angle of a black separation is equal to approximately seventy-five degrees.

6. An apparatus for generating a dot signal for a plurality of color separations to record a halftone image of each color separation, comprising:

area dividing means for dividing a whole image area into a plurality of image areas;

screen angle assigning means for assigning a set of screen angles for said plurality of color separations with respect to each of said plurality of image areas;

a first memory for storing a plurality of color-separated image signals for said plurality of color separations, said plurality of color-separated image signals representing a color image in said whole image area;

a second memory for storing a plurality of screen pattern data for said plurality of color separations;

selection means for selecting one of said plurality of screen pattern data for each color separation in each of said plurality of image areas according to said assigned set of screen angles assigned to each of said plurality of image areas; and a dot signal generator for comparing the selected screen pattern data with the color-separated image data for each separation, to thereby generate a dot signal for recording a halftone image of each color separation, wherein said plurality of color separations include four color separations for yellow, magenta, cyan and black inks and said apparatus, further comprising:

a third memory for storing mode data assigned to each of the plurality of image areas, the mode data representing a first mode where screen angles of the four color separations are set at predetermined standard values, and a second mode where the screen angles of the four color separations are adjusted from the predetermined standard values; and screen angle data generating means for producing the screen angle data representing screen angles $\theta(Y)$, $\theta(M)$, $\theta(C)$, and $\theta(K)$ for yellow, magenta, cyan, and black, respectively, according to the following Table A with respect to pixels to which the mode data indicating the second mode is assigned:

TABLE A

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y | N/A | 45 | — | — | — |
| M | N/A | — | 45 | — | — |
| C | N/A | — | — | 45 | — |
| K | N/A | — | — | — | 45 |
| Y and M | N/A | 0 | 45 | — | — |
| Y and C | N/A | 0 | — | 45 | — |
| Y and K | N/A | 0 | — | — | 45 |
| M and C | D(M) > D(C) | — | 45 | 0 | — |
| M and C | D(M) ≦ D(C) | — | 0 | 45 | — |
| M and K | D(M) > D(K) | — | 45 | — | 0 |
| M and K | D(M) ≦ D(K) | — | 0 | — | 45 |
| C and K | D(C) > D(K) | — | — | 45 | 0 |
| C and K | D(C) ≦ D(K) | — | — | 0 | 45 |
| Y, M and C | D(M) > D(C) | 75 | 45 | 15 | — |
| Y, M and C | D(M) ≦ D(C) | 75 | 15 | 45 | — |
| Y, M and K | D(M) > D(K) | 75 | 45 | — | 15 |
| Y, M and K | D(M) ≦ D(K) | 75 | 15 | — | 45 |
| Y, C and K | D(C) > D(K) | 75 | — | 45 | 15 |
| Y, C and K | D(C) ≦ D(K) | 75 | — | 15 | 45 |
| M, C and K | D(M) > D(C) & D(M) > D(K) | — | 45 | 15 | 75 |
| M, C and k | D(C) ≧ D(M) & D(C) > D(K) | — | 15 | 45 | 75 |
| M, C and k | D(K) ≧ D(M) & D(K) ≧ D(C) | — | 15 | 75 | 45 |
| Y, M, C and K | D(M) > D(C) & D(M) > D(K) | 0 | 45 | 15 | 75 |
| Y, M, C and k | D(C) ≧ D(M) & D(C) > D(K) | 0 | 15 | 45 | 75 |
| Y, M, C and k | D(K) ≧ D(M) & D(K) ≧ D(C) | 0 | 15 | 75 | 45 | where D(Y), D(M), D(C), and D(K) denote dot percentages of yellow, magenta, cyan, and black, respectively, "N/A" means that there are no conditions for the relations among the dot percentages D(Y), D(M), D(C), and D(K).

7. An apparatus for generating a dot signal for a plurality of color separations to record a halftone image of each color separation, comprising:

area dividing means for dividing a whole image area into a plurality of image areas;

screen angle assigning means for assigning a set of screen angles for said plurality of color separations with respect to each of said plurality of image areas;

a first memory for storing a plurality of color-separated image signals for said plurality of color separations, said plurality of color-separated image signals representing a color image in said whole image area;

a second memory for storing a plurality of screen pattern data for said plurality of color separations;

selection means for selecting one of said plurality of screen pattern data for each color separation in each of said plurality of image areas according to said assigned set of screen angles assigned to each of said plurality of image areas; and a dot signal generator for comparing the selected screen pattern data with the color-separated image data for each separation, to thereby generate a dot signal for recording a halftone image of each color separation, wherein said plurality of color separations include four color separations for yellow, magenta, cyan and black inks and said apparatus, further comprising:

a third memory for storing mode data assigned to each of the plurality of image areas, the mode data representing a first mode where screen angles of the four color separations are set at predetermined standard values, and a second mode when the screen angles of the four color separations are adjusted from the predetermined standard values; and screen angle data generating means for producing the screen angle data representing screen angles 0(Y), 0(M), 0(C), and 0(K) for yellow, magenta, cyan and black, respectively, according to the following Table B with respect to pixels to which the mode data indicating the second mode is assigned:

TABLE B

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y | N/A | 45 | — | — | — |
| M | N/A | — | 45 | — | — |
| C | N/A | — | — | 45 | — |
| K | N/A | — | — | — | 45 |
| Y and M | N/A | 0 | 45 | — | — |
| Y and C | N/A | 0 | — | 45 | — |
| Y and K | N/A | 0 | — | — | 45 |
| M and C | D(M) > D(C) | — | 45 | 15 | — |
| M and C | D(M) ≦ D(C) | — | 15 | 45 | — |
| M and K | D(M) > D(K) | — | 45 | — | 75 |
| M and K | D(M) ≦ D(K) | — | 15 | — | 45 |
| C and K | D(C) > D(K) | — | — | 45 | 75 |
| C and K | D(C) ≦ D(K) | — | — | 15 | 45 |
| Y, M and C | D(M) > D(C) | 15/75 | 45 | 0 | — |
| Y, M and C | D(M) ≦ D(C) | 15/75 | 0 | 45 | — |
| Y, M and K | D(M) > D(K) | 15/75 | 45 | — | 0 |
| Y, M and K | D(M) ≦ D(K) | 15/75 | 0 | — | 45 |
| Y, C and K | D(C) > D(K) | 15/75 | — | 45 | 0 |
| Y, C and K | D(C) ≦ D(K) | 15/75 | — | 0 | 45 |
| M, C and K | D(M) > D(C) & D(M) > D(K) | — | 45 | 15 | 75 |
| M, C and k | D(C) ≧ D(M) & D(C) > D(K) | — | 15 | 45 | 75 |
| M, C and k | D(K) ≧ D(M) & D(K) ≧ D(C) | — | 15 | 75 | 45 |
| Y, M, C and K | D(M) > D(C) & D(M) > D(K) | 0 | 45 | 15 | 75 |
| Y, M, C and k | D(C) ≧ D(M) & D(C) > D(K) | 0 | 15 | 45 | 75 |
| Y, M, C and k | D(K) ≧ D(M) & D(K) ≧ D(C) | 0 | 15 | 75 | 45 | where D(Y), D(M), D(C), and D(K) denote dot percentages of yellow, magenta, cyan, and black, respectively, "N/A" means that there are no conditions for the relations among the dot percentages D(Y), D(M), D(C), and D(K), and "15/75" means arbitrary one of 15° and 75°.

8. A method for generating a dot signal for a plurality of color separations to record a halftone image of each color separation, comprising the steps of:

dividing a whole image area into a plurality of image areas;

assigning a set of screen angles for said plurality of color separations with respect to each of said plurality of image areas;

storing a plurality of color-separated image signals for said plurality of color separations, said plurality of color-separated image signals representing a color image in said whole image area;

storing a plurality of screen pattern data for said plurality of color separations;

selecting one of said plurality of screen pattern data for each color separation in each of said plurality of image areas according to said assigned set of screen angles assigned to each of said plurality of image areas; and comparing the selected screen pattern data with the color-separated image data for each separation, to thereby generate a dot signal for recording a halftone image of each color separation, wherein said plurality of color separations include four separations for yellow, magenta, cyan and black inks, and said method further comprises the steps of:

specifying mode data for each of the plurality of image areas, the mode data representing a first mode where screen angles of the four color separations are set at predetermined standard values, and a second mode where the screen angles of the four color separations are adjusted from the predetermined standard values, and producing the screen angle data representing screen angles θ(Y), θ(M), θ(C), and θ(K) for yellow, magenta, cyan, and black, respectively, according to the following Table B with respect to pixels to which the mode data indicating the second mode is assigned:

TABLE B

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y | N/A | 45 | — | — | — |
| M | N/A | — | 45 | — | — |
| C | N/A | — | — | 45 | — |
| K | N/A | — | — | — | 45 |
| Y and M | N/A | 0 | 45 | — | — |
| Y and C | N/A | 0 | — | 45 | — |
| Y and K | N/A | 0 | — | — | 45 |
| M and C | D(M) > D(C) | — | 45 | 15 | — |
| M and C | D(M) ≦ D(C) | — | 15 | 45 | — |
| M and K | D(M) > D(K) | — | 45 | — | 75 |
| M and K | D(M) ≦ D(K) | — | 15 | — | 45 |
| C and K | D(C) > D(K) | — | — | 45 | 75 |
| C and K | D(C) ≦ D(K) | — | — | 15 | 45 |
| Y, M and C | D(M) > D(C) | 15/75 | 45 | 0 | — |
| Y, M and C | D(M) ≦ D(C) | 15/75 | 0 | 45 | — |
| Y, M and K | D(M) > D(K) | 15/75 | 45 | — | 0 |
| Y, M and K | D(M) ≦ D(K) | 15/75 | 0 | — | 45 |
| Y, C and K | D(C) > D(K) | 15/75 | — | 45 | 0 |
| Y, C and K | D(C) ≦ D(K) | 15/75 | — | 0 | 45 |
| M, C and K | D(M) > D(C) & D(M) > D(K) | — | 45 | 15 | 75 |
| M, C and k | D(C) ≧ D(M) & D(C) > D(K) | — | 15 | 45 | 75 |
| M, C and k | D(K) ≧ D(M) & D(K) ≧ D(C) | — | 15 | 75 | 45 |
| Y, M, C and K | D(M) > D(C) & D(M) > D(K) | 0 | 45 | 15 | 75 |
| Y, M, C and k | D(C) ≧ D(M) & D(C) > D(K) | 0 | 15 | 45 | 75 |
| Y, M, C and k | D(K) ≧ D(M) & D(K) ≧ D(C) | 0 | 15 | 75 | 45 | where D(Y), D(M), D(C), and D(K) denote dot percentages of yellow, magenta, cyan, and black, respectively, "N/A" means that there are no conditions for the relations among the dot percentages D(Y), D(M), D(C), and D(K), and "15/75" means arbitrary one of 15° and 75°.

9. A method for generating a dot signal for a plurality of color separations to record a halftone image of each color separation, comprising the steps of:

dividing a whole image area into a plurality of image areas;

assigning a set of screen angles for said plurality of color separations with respect to each of said plurality of image areas;

storing a plurality of color-separated image signals for said plurality of color separations, said plurality of color-separate image signals representing a color image in said whole image area;

storing a plurality of screen pattern data for said plurality of color separations;

selecting one of said plurality of screen pattern data for each color separation in each of said plurality of image areas according to said assigned set of screen angles assigned to each of said plurality of image areas; and comparing the selected screen pattern data with the color-separated image data for each separation, to thereby generate a dot signal for recording a halftone image of each color separation, wherein said plurality of color separations include four separations for yellow, magenta, cyan and black inks, and said method further comprises the step of:

specifying reference data for an overlapping area, the overlapping area being formed between first and second image areas so that a density of each of four color separations of said overlapping area is equal to one of the first and second image areas, said reference data indicating, with respect to each of the magenta and cyan separations, which one of two screen angles for the first and second image areas is used as a screen angle of the overlapping area.

10. A method for generating a dot signal for a plurality of color separations to record a halftone image of each color separation, comprising the steps of:

dividing a whole image area into a plurality of image areas;

assigning a set of screen angles for said plurality of color separations with respect to each of said plurality of image areas;

storing a plurality of color-separated image signals for said plurality of color separations, said plurality of color-separated image signals representing a color image in said whole image area;

storing a plurality of screen pattern data for said plurality of color separations;

selecting one of said plurality of screen pattern data for each color separation in each of said plurality of image areas according to said assigned set of screen angles assigned to each of said plurality of image areas; and comparing the selected screen pattern data with the color-separated image data for each separation, to thereby generate a dot signal for recording a halftone image of each color separation, wherein said plurality of color separations include four separations for yellow, magenta, cyan and black inks, and said method further comprises the steps of:

specifying mode data for each of the plurality of image areas, the mode data representing a first mode where screen angles of the magenta and cyan separations are set at predetermined standard values, and a second mode where the screen angles of the magenta and cyan separations are exchanged each other from the predetermined standard values; and producing the screen angle data of the magenta and cyan separations according to the mode data.

11. A method in accordance with claim 10, wherein a combination of the screen angles of the magenta and cyan separations are 15 degrees and 45 degrees.

12. A method in accordance with claim 10, wherein said step of producing the screen angle data of the magenta and cyan separations according to the mode data comprises the steps of:

determining the screen angles of the magenta and cyan separations so that one of the magenta and cyan separations which has a greater dot percentage but is not equal to 100% has a screen angle of approximately forty-five degrees, and that the other of the magenta and cyan separations has a screen angle of approximately fifteen degrees.

13. A method in accordance with claim 12, wherein the screen angle data further indicates that a screen angle of a yellow separation is equal to approximately zero degrees, and that a screen angle of a black separation is equal to approximately seventy-five degrees.

14. A method for generating a dot signal for a plurality of color separations to record a halftone image of each color separation, comprising the steps of:

dividing a whole image area into a plurality of image areas;

assigning a set of screen angles for said plurality of color separations with respect to each of said plurality of image areas;

storing a plurality of color-separated image signals for said plurality of color separations, said plurality of color-separated image signals representing a color image in said whole image area;

storing a plurality of screen pattern data for said plurality of color separations;

selecting one of said plurality of screen pattern data for each color separation in each of said plurality of image areas according to said assigned set of screen angles assigned to each of said plurality of image areas; and comparing the selected screen pattern data with the color-separated image data for each separation, to thereby generate a dot signal for recording a halftone image of each color separation, wherein said plurality of color separations include four separations for yellow, magenta, cyan and black inks, and said method further comprises the steps of:

specifying mode data for each of the plurality of image areas, the mode data representing a first mode where screen angles of the four color separations are set at predetermined standard values, and a second mode where the screen angles of the four color separations are adjusted from the predetermined standard values; and producing the screen angle data representing screen angles θ(Y), θ(M), θ(C), and θ(K) for yellow, magenta, cyan and black, respectively, according to the following Table A with respect to pixels to which the mode data indicating the second mode is assigned:

TABLE A

| COLOR SEPARATION | RELATIONS OF DOT % | SCREEN ANGLES | | | |
|---|---|---|---|---|---|
| NEITHER 100%/0% | D(Y), D(M), D(C), D(K) | θ (Y) | θ (M) | θ (C) | θ (K) |
| Y | N/A | 45 | — | — | — |
| M | N/A | — | 45 | — | — |
| C | N/A | — | — | 45 | — |
| K | N/A | — | — | — | 45 |
| Y and M | N/A | 0 | 45 | — | — |
| Y and C | N/A | 0 | — | 45 | — |
| Y and K | N/A | 0 | — | — | 45 |
| M and C | D(M) > D(C) | — | 45 | 0 | — |
| M and C | D(M) ≦ D(C) | — | 0 | 45 | — |
| M and K | D(M) > D(K) | — | 45 | — | 0 |
| M and K | D(M) ≦ D(K) | — | 0 | — | 45 |
| C and K | D(C) > D(K) | — | — | 45 | 0 |
| C and K | D(C) ≦ D(K) | — | — | 0 | 45 |
| Y, M and C | D(M) > D(C) | 75 | 45 | 15 | — |
| Y, M and C | D(M) ≦ D(C) | 75 | 15 | 45 | — |
| Y, M and K | D(M) > D(K) | 75 | 45 | — | 15 |
| Y, M and K | D(M) ≦ D(K) | 75 | 15 | — | 45 |
| Y, C and K | D(C) > D(K) | 75 | — | 45 | 15 |
| Y, C and K | D(C) ≦ D(K) | 75 | — | 15 | 45 |
| M, C and K | D(M) > D(C) & D(M) > D(K) | — | 45 | 15 | 75 |
| M, C and k | D(C) ≧ D(M) & D(C) > D(K) | — | 15 | 45 | 75 |
| M, C and k | D(K) ≧ D(M) & D(K) ≧ D(C) | — | 15 | 75 | 45 |
| Y, M, C and K | D(M) > D(C) & D(M) > D(K) | 0 | 45 | 15 | 75 |
| Y, M, C and k | D(C) ≧ D(M) & D(C) > D(K) | 0 | 15 | 45 | 75 |
| Y, M, C and k | D(K) ≧ D(M) & D(K) ≧ D(C) | 0 | 15 | 75 | 45 | where D(Y), D(M), D(C), and D(K) denote dot percentages of yellow, magenta, cyan and black, respectively, "N/A" means that there are no conditions for the relations among the dot percentages D(Y), D(M), D(C), and D(K).

* * * * *